United States Patent
Morimura et al.

(10) Patent No.: US 8,117,641 B2
(45) Date of Patent: Feb. 14, 2012

(54) CONTROL DEVICE AND CONTROL METHOD FOR INFORMATION SYSTEM

(75) Inventors: Tomohiro Morimura, Yokohama (JP); Yoshimasa Masuoka, Kunitachi (JP); Naoki Utsunomiya, Machida (JP)

(73) Assignee: Hitachi, Ltd., Tokyo (JP)

( * ) Notice: Subject to any disclaimer, the term of this patent is extended or adjusted under 35 U.S.C. 154(b) by 1125 days.

(21) Appl. No.: 11/528,888

(22) Filed: Sep. 27, 2006

(65) Prior Publication Data

US 2007/0169167 A1   Jul. 19, 2007

(30) Foreign Application Priority Data

Jan. 17, 2006 (JP) .................................. 2006-009097
Mar. 31, 2006 (JP) .................................. 2006-096406

(51) Int. Cl.
*H04L 29/00* (2006.01)
(52) U.S. Cl. ............................................. 726/1; 726/2
(58) Field of Classification Search .................... 726/1, 2
See application file for complete search history.

(56) References Cited

U.S. PATENT DOCUMENTS

2005/0102674 A1* 5/2005 Tameshige et al. ........... 718/100
2006/0015871 A1   1/2006 Emaru et al.
2006/0136988 A1* 6/2006 Raja et al. ......................... 726/1

FOREIGN PATENT DOCUMENTS

JP   07-295840   11/1995
JP   2001-236363   8/2001
JP   2005-141605   6/2005

OTHER PUBLICATIONS

IBM Tivoli Policy Management for Autonomic Computing, Version 12, "Policy Management for Autonomic", Copyright IBM Corp. 2005.

\* cited by examiner

*Primary Examiner* — Vivek Srivastava
*Assistant Examiner* — Helai Salehi
(74) *Attorney, Agent, or Firm* — Kilpatrick Townsend & Stockton LLP

(57) ABSTRACT

A technique of performing concurrency control of policies is provided, which makes it possible to efficiently utilize resources of an overall information system. According to the present invention, a policy execution device creates a list of components of a application system which are influenced by execution of an action of a policy instance, for respective policy instances. If trigger conditions of another policy instance are newly met during execution of a policy instance, the policy execution device compares a list of components of the policy instance presently being executed with a list of components of the policy instance whose trigger conditions are newly met. If there are no common components in the lists, the policy execution device executes the policy instance whose trigger conditions are newly met, and if there are common components in the lists, the policy execution device suspends the policy instance whose trigger conditions are newly met.

10 Claims, 26 Drawing Sheets

FIG. 9

RESOURCE CONFIGURATION STORAGE UNIT 133

| RESOURCE ID | TARGET CLASS | APPLICATION SYSTEM INSTANCE NAME |
|---|---|---|
| M_001 | Logical LB | Job 1 job 2 |
| M_002 | Logical WB | job 1 |
| M_003 | Logical WB | NOT ALLOCATED |
| M_004 | Logical DB | Job 1 job 2 |
| ⋮ | ⋮ | ⋮ |

POLICY DEFINITION INFORMATION

FIG. 11
ACTION TARGET INSTANCE STORAGE UNIT 135

| POLICY INSTANCE | ACTION TARGET INSTANCE |
|---|---|
| job1.p#1 | Web Tier#1,Logical Web#1,Web Server#1,Logical Web#2, Web Server#2,Logical LB#1,LB#1 |
| job1.q#1 | Logical Web#1,Web Server#1, |
| job2.p#1 | Web Tier#1,Logical Web#3,Web Server#3,Logical Web#4, Web Server#4,Logical LB#1,LB#1 |
| job2.q#1 | Logical Web#3,Web Server#3, |
| job1.s#1 | Logical DB#1,DB#1 |

FIG. 12
POLICY SCHEDULE STORAGE UNIT 136

| POLICY INSTANCE | TIME WHEN CONDITIONS ARE MET | PRIORITY | EXECUTION STATE |
|---|---|---|---|
| job1.p#1 | 2005 : 9 : 21:15 : 30 : 13 | 2 | RUNNING |
| job1.q#1 | 2005 : 9 : 21:15 : 34 : 03 | 1 | WAITING |
| job2.p#1 | 2005 : 9 : 21:16 : 10 : 02 | 2 | WAITING |
| job1.s#1 | 2005 : 9 : 21:16 : 12 : 32 | 3 | READY |

FIG. 13

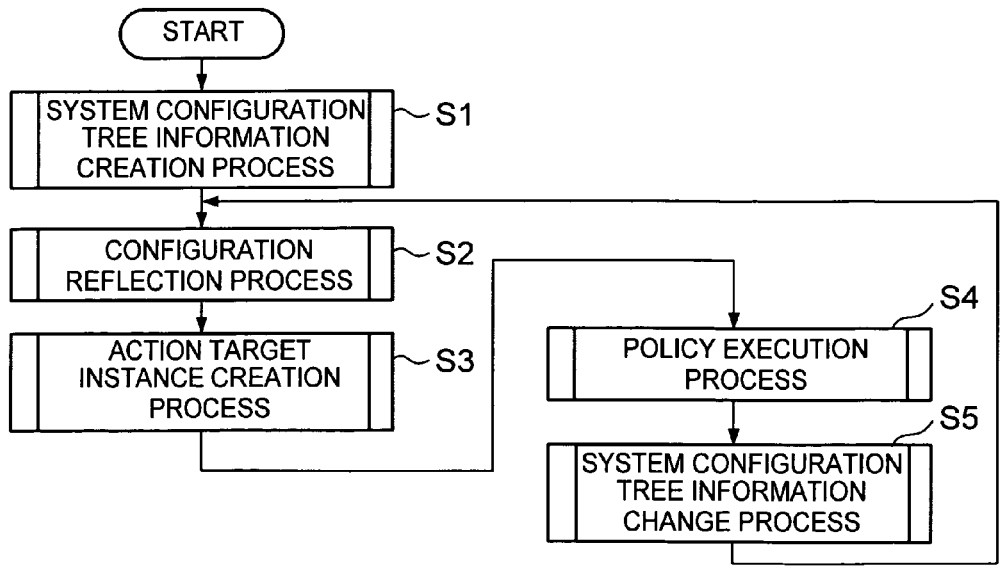

SYSTEM CONFIGURATION TREE
INFORMATION CREATION PROCESS S1

LOGICAL INSTANCE CONFIGURATION TREE INFORMATION

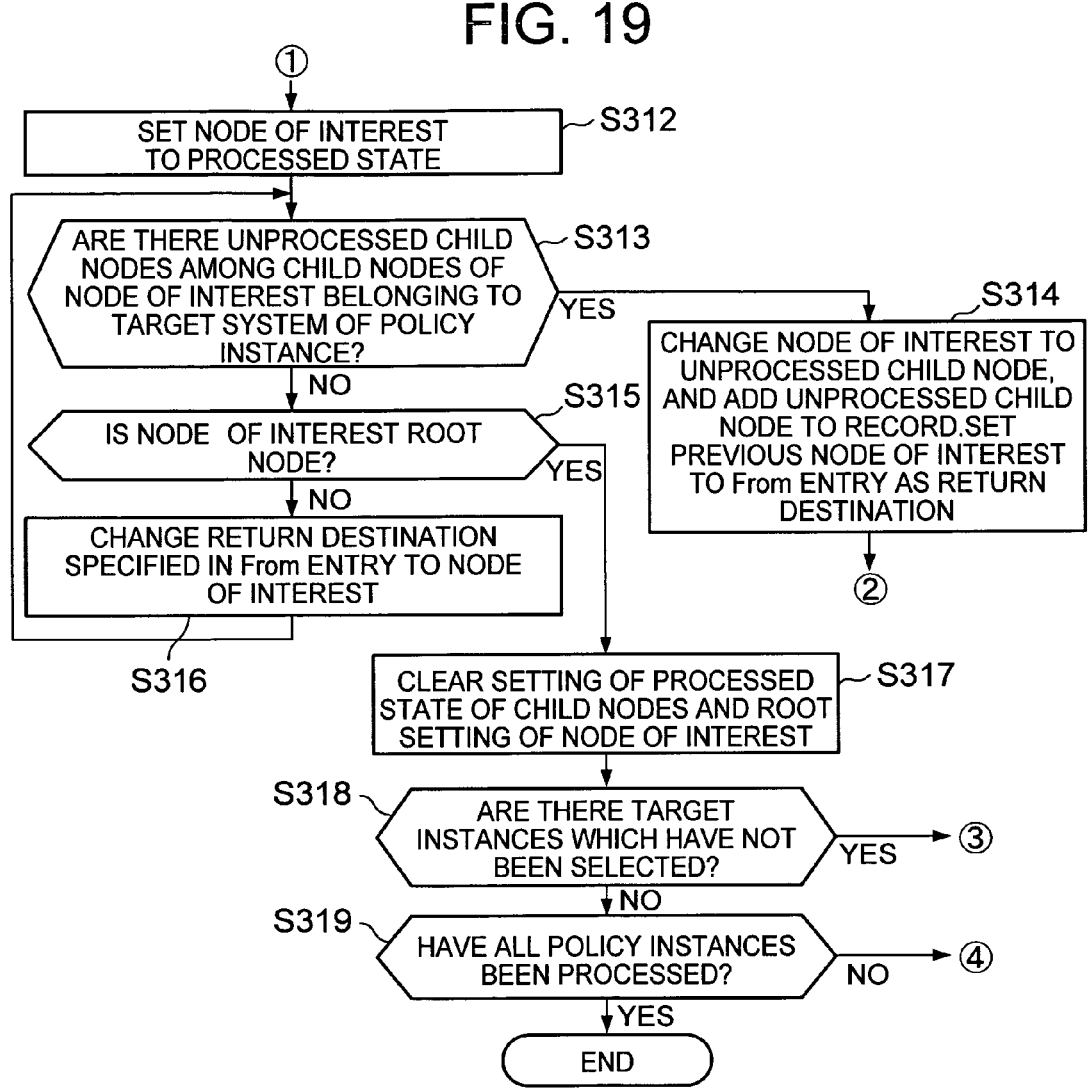

SUBTREE INFORMATION

FIG. 30

POLICY SCHEDULE STORAGE UNIT 136

| NODE INSTANCE | POLICY INSTANCE | OPERATION NUMBER | TIME WHEN CONDITIONS ARE MET | PRIORITY | EXECUTION STATE |
|---|---|---|---|---|---|
| Web Tier#1 | job 1.p#1 | 1 | 2005 : 9 : 21 15 : 30 : 13 | 2 | RUNNING |
| Web Tier#1 | job 2.p#1 | 1 | 2005 : 9 : 21 15 : 34 : 03 | 2 | WATING |
| Logical Web #1 | job 1.p#1 | 1 | 2005 : 9 : 21 15 : 30 : 13 | 2 | RUNNING |
| Logical Web #3 | job 2.p#1 | 1 | 2005 : 9 : 21 15 : 34 : 03 | 2 | WATING |

| NODE INSTANCE | POLICY INSTANCE | OPERATION NUMBER | TIME WHEN CONDITIONS ARE MET | PRIORITY | EXECUTION STATE |
|---|---|---|---|---|---|
| Web Tier#1 | job 1.p#1 | 1 | 2005 : 9 : 21 15 : 30 : 13 | 2 | RUNNING |
| Logical Web #1 | job 1.p#1 | 1 | 2005 : 9 : 21 15 : 30 : 13 | 2 | RUNNING |
| Web Tier#1 | job 2.p#1 | 1 | 2005 : 9 : 21 15 : 34 : 03 | 2 | WATING |
| Logical Web #3 | job 2.p#1 | 1 | 2005 : 9 : 21 15 : 34 : 03 | 2 | RUNNING |

⇩

T1102

| NODE INSTANCE | POLICY INSTANCE | OPERATION NUMBER | TIME WHEN CONDITIONS ARE MET | PRIORITY | EXECUTION STATE |
|---|---|---|---|---|---|
| Web Tier#1 | job 2.p#1 | 1 | 2005 : 9 : 21 15 : 34 : 03 | 2 | RUNNING |
| Logical Web #3 | job 2.p#1 | 1 | 2005 : 9 : 21 15 : 34 : 03 | 2 | RUNNING |

⇩

T1103

| NODE INSTANCE | POLICY INSTANCE | OPERATION NUMBER | TIME WHEN CONDITIONS ARE MET | PRIORITY | EXECUTION STATE |
|---|---|---|---|---|---|
| Web Tier#1 | job 2.p#1 | 1 | 2005 : 9 : 21 15 : 34 : 03 | 2 | RUNNING |
| Logical Web #3 | job 2.p#1 | 1 | 2005 : 9 : 21 15 : 34 : 03 | 2 | RUNNING |
| Logical LB#1 | job 1.p#1 | 2 | 2005 : 9 : 21 15 : 30 : 13 | 2 | RUNNING |
| LB #1 | job 1.p#1 | 2 | 2005 : 9 : 21 15 : 30 : 13 | 2 | RUNNING |

⇩

T1104

| NODE INSTANCE | POLICY INSTANCE | OPERATION NUMBER | TIME WHEN CONDITIONS ARE MET | PRIORITY | EXECUTION STATE |
|---|---|---|---|---|---|
| Logical LB#1 | job 1.p#1 | 2 | 2005 : 9 : 21 15 : 30 : 13 | 2 | RUNNING |
| LB #1 | job 1.p#1 | 2 | 2005 : 9 : 21 15 : 30 : 13 | 2 | RUNNING |

CONTROL DEVICE AND CONTROL METHOD FOR INFORMATION SYSTEM

BACKGROUND OF THE INVENTION

The present invention relates to a control technology for executing policies.

There is an automatic execution system for an information system, which produces rules for causing the information system to execute certain operations (referred to as actions) if certain conditions (referred to as trigger conditions) are met. These rules thus created are referred to as policies, and are described as a pair of a set of trigger conditions and a set of actions. This automatic execution system is capable of handling a failure of a server device by describing the symptom when the failure occurs in the server system, as a trigger condition of a policy, and by describing a countermeasure operation for the failure, as an action of the policy. Moreover, this type of automatic execution system is also used to automate standard processes such as maintenance of a server device, during the operation and management of the information system.

In the automatic execution system, the trigger conditions include availability of physical resources such as a CPU, a memory, disks of server devices, and I/O devices, or availability of logical resources, such as a request number, a process number, a throughput, and a response time, provided by programs running on the physical resources. Moreover, if certain trigger conditions are met, the automatic execution system is also used to automate reconfiguration of the information system, such as monitoring of components, addition and deletion of server devices, changes of other physical resources, and changes of set values for programs which control logical resources, by executing certain actions such as deploy, start, stop, and un-deploy of components, other operation/management operations, and monitoring operation of components. Further, the automatic execution system specifies various phenomena and states occurring in the logical resources as trigger conditions, and executes actions corresponding to these phenomena and states, to thereby automatically handle these phenomena and states.

In the automatic execution system, trigger conditions of multiple policies may be met at the same time. In this case, if these policies, for which the trigger conditions are met, include multiple policies requesting the information system for actions incompatible with one another, and the actions requested by the policies for which the trigger conditions are met are independently executed in parallel, the information system operation may become unstable. Therefore, it is necessary to perform concurrency control such as suspending other policies while a certain policy is being executed. Such concurrency control is often employed in transaction processing for a database. Moreover, the concurrency control is also employed for task scheduling for an OS (refer to Japanese Patent Laid-Open Publication No. H07-295840).

Moreover, for efficient utilization of resources, which is an object of the information system, there has been devised a resource distribution method for reducing resource maintenance/management costs of the information system by sharing resources among multiple services based on predictions made on future resource availability (refer to Japanese Patent Laid-Open Publication No. 2005-141605). The method also employs an automatic execution system based on policies.

However, the concurrency control employed in the automatic execution system for policies is realized by sequentially executing respective policies, or employing a mutual exclusion mechanism provided for independent objects (such as load balancer) to be operated by an action of a policy. As a result, the conventional automatic execution system is not capable of scheduling policies in consideration of resources of the overall information system, which results in inefficient concurrency control.

SUMMARY OF THE INVENTION

The present invention has been made in view of the foregoing problems, and it is therefore an object of the present invention to perform concurrency control of policies, which makes it possible to efficiently utilize resources of an overall information system while securing safe automatic execution of policies.

In order to achieve the above-mentioned object, according to the present invention, a list of components of a application system which may be influenced by execution of a policy (map of extent of influence) is created for respective policies. While a certain policy is being executed, if trigger conditions of another policy are met, a list of components corresponding to the policy being executed is compared with a list of components of the policy whose trigger conditions are newly met. If there are no common components, the policy whose trigger conditions are newly met is executed, and if there are common components, the execution of the policy whose trigger conditions are newly met is suspended.

For example, the present invention provides a control device for controlling an information system constituting a application system, including: a configuration information storage unit which stores application system configuration information including connection information on respective components constituting the application system to be operated; a policy storage unit which stores a policy including an action entry including a description of a component to be operated and of an operation to be executed by the component, and a trigger condition entry including a description of a condition for triggering the component to execute the operation; a list storage unit which stores a list including a component to be operated described in the action entry of a policy, and all components connected downstream of the component, for the respective policies stored in the policy storage unit, according to the application system configuration information stored in the configuration information storage unit; an event reception section which receives an event occurring in the information system, or an operation result reception section which receives a result of an operation performed in the information system; and a policy executing section which executes an operation described in the action entry of a policy including a trigger condition entry corresponded to the event received by the event reception section, or of a policy including a trigger condition entry corresponded to the operation result received by the operation result reception section, in which: the policy execution section compares, when a policy including a trigger condition entry corresponded to the event received by the event reception section is newly detected or to the operation result received by the operation result reception section during execution of a policy, a list which is stored in the list storage unit as being associated with the policy being executed, with a list which is stored in the list storage unit as being associated with the newly detected policy; when both of the policies do not include a common component, the policy executing section executes the newly detected policy; and when both of the policies include a common component, the policy executing section suspends the execution of the newly detected policy.

According to the present invention, for efficient utilization of resources of an overall information system, when trigger conditions of another policy are met during execution of a certain policy, it is possible to perform concurrency control of these policies, namely, to determine whether to execute or to suspend the policy whose trigger conditions are newly met.

BRIEF DESCRIPTION OF THE DRAWINGS

In the accompanying drawings:

FIG. 9 is a schematic diagram showing registered contents of a resource configuration storage unit;

FIG. 11 is a schematic diagram showing registered contents of an action target instance storage unit;

FIG. 12 is a schematic diagram showing registered contents of a policy schedule storage unit;

FIG. 13 is a flowchart explaining an operation outline of the policy execution device according to the first embodiment;

FIG. 19 is a flowchart explaining the action target instance creation process shown in FIG. 13;

FIG. 20 is a diagram explaining the action target instance producing process shown in FIG. 13;

FIG. 30 is a schematic diagram showing registered contents of a policy schedule storage unit according to a fourth embodiment; and FIG. 31 is a schematic diagram showing an example of a transition of records stored in the policy schedule storage unit according to the fourth embodiment.

DESCRIPTION OF THE PREFERRED EMBODIMENTS

The above-described components include physical computer resources such as an overall computer device, a CPU constituting the computer device, a storage device such as a memory and a disk, an I/O device, and a network device, logical computer resources such as a computer program executed on the physical computer, and abstract data structures and logical objects handled by the logical computer resources.

In addition, the components include monitored items which can be observed by a policy for a physical computer resource, such as CPU utilization, disk utilization, memory usage, disk usage, the number of running threads, and the number of network connections; monitored items relating to functions provided by the computer program, which is a logical computer resource, such as a processing request from a user, the number of throughput items, and a response time when a certain function is used; and elements constituting an IT resource.

Objects to be operated in this specification include objects of a monitoring operation for the above-described components, and objects of operation management operations such as deploy, start, stop, and un-deploy.

Concurrency control of policies in this specification refers to an execution control technology including execution control which, if there are multiple policies whose trigger conditions are met, determines whether policies whose trigger conditions are met can be executed concurrently in order to execute or suspend the policies, executes the policies in parallel or concurrently if they can be executed concurrently, and executes some of them and suspends the rest of them if they cannot be executed concurrently. The present invention relates to concurrency control of policies.

First Embodiment

Figure 1:
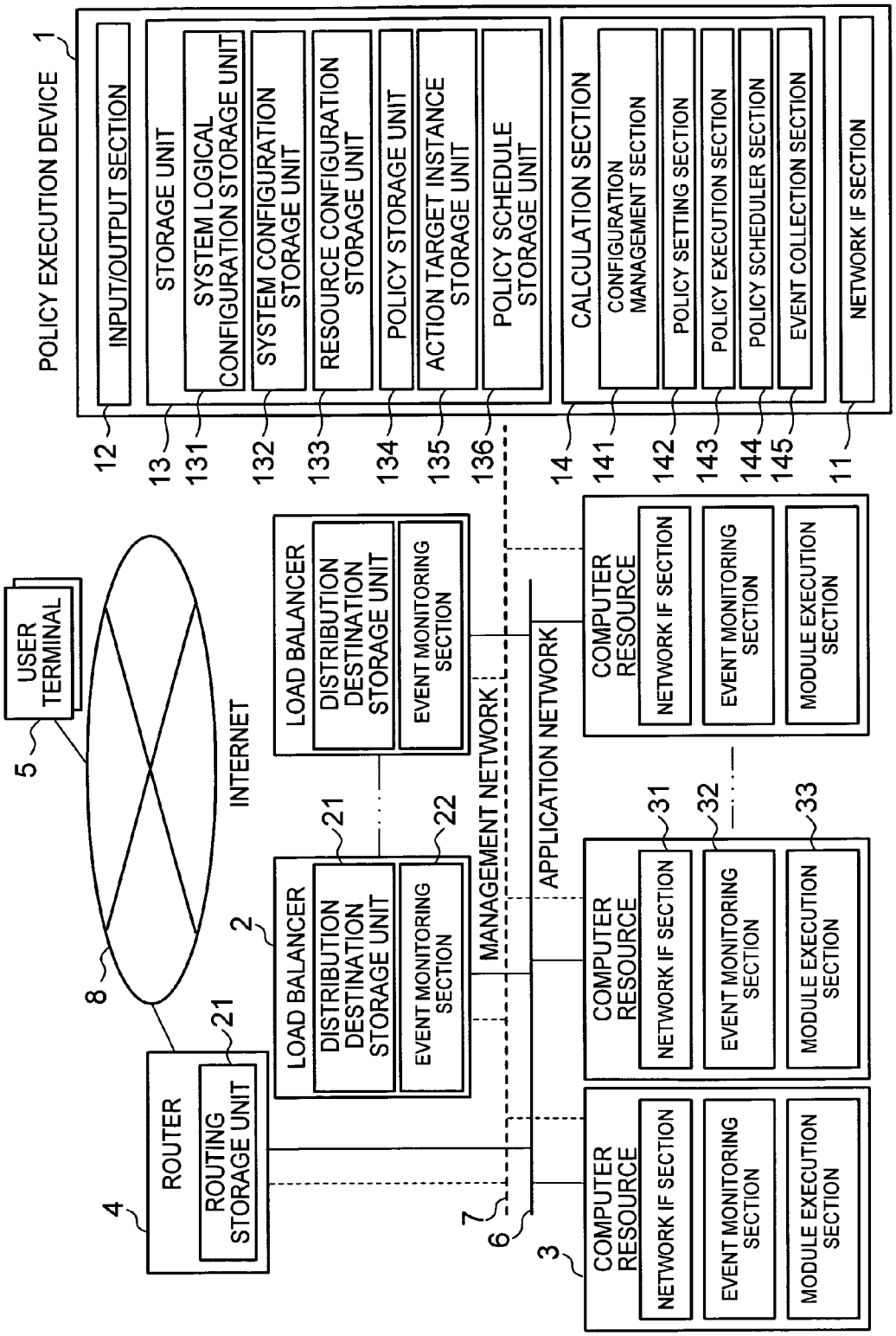
FIG. 1 is a schematic diagram showing a policy automatic execution system according to a first embodiment of the present invention.

FIG. 1 is a schematic diagram of a policy automatic execution system according to a first embodiment of the present invention. As illustrated, the policy automatic execution system according to this embodiment includes a policy execution device 1, multiple load balancers 2 and computer resources 3 constituting an information system, a router 4 connecting the information system to the Internet 8, and a user terminal 5 which uses the information system via the Internet 8.

The policy execution device 1, the load balancers 2, the computer resources 3, and the router 4 are connected with each other via an application network 6, and a management network 7 respectively. The application network 6 is a network used by the computer resources 3 to provide the user terminal 5 with services. The management network 7 is a network used by the policy execution device 1 to manage the load balancers 2, the computer resources 3, and the router 4.

The application network 6 and the management network 7 may be constructed physically independently using separate cables, or logically independently on the same cable.

The router 4 includes a routing storage unit 21 which stores correspondences between a global IP address and a local IP address for the respective load balancers 2. The router 4 transmits a request received from the user terminal 5 via the Internet 8 to the load balancer 2 having a local IP address corresponding to a global IP address specified as a destination of the request according to the correspondences stored in the routing storage unit 21. Moreover, the router 4 transmits a processed result of the request received from the load balancer 2 to the user terminal 5 which is the source of the transmitted request via the Internet 8. Other functions of the router 4 are the same as those of conventional routers, and a detailed description thereof, therefore, is omitted.

Figure 2:
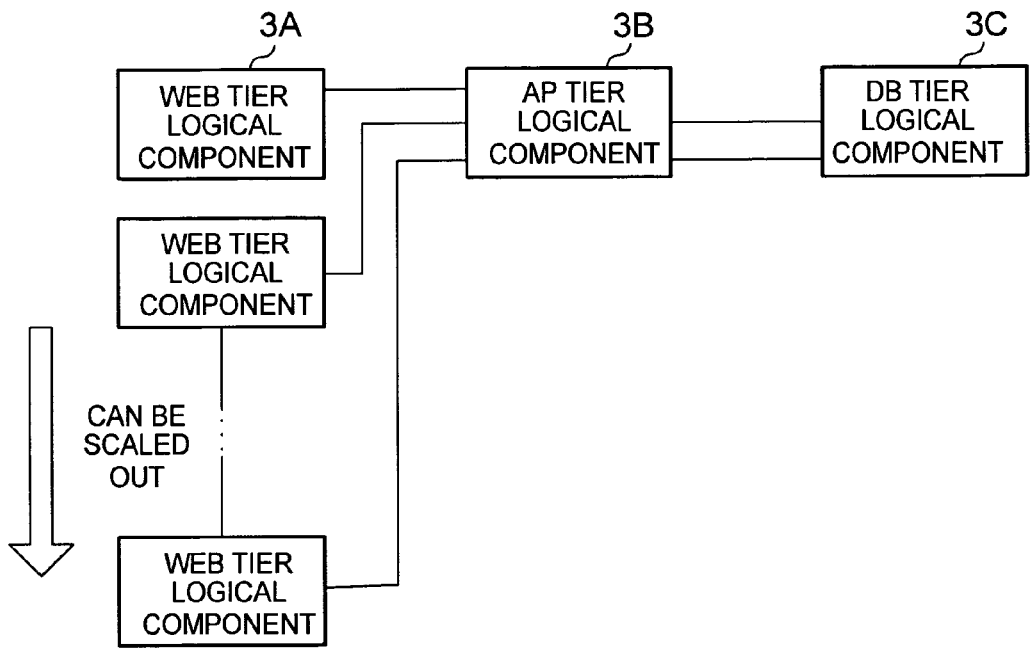
FIG. 2 is a diagram explaining a application system based on a Web 3-tier model.

The load balancers 2 form a application system along with multiple computer resources 3 via the application network 6. In this embodiment, the application system follows the Web 3-tier model shown in FIG. 2. The application system following the Web 3-tier model is constructed by Web tier logical components 3A which receive requests from users via Web browsers, application tier logical component 3B which processes services provided for the users, and data tier logical component 3C. The Web tier logical component 3A is constituted by Web servers which can be scaled out (i.e., increased/decreased), the application tier logical component 3B is constituted by an application server, and the data tier logical component 3C is constituted by a database server. A computer resource 3 on which a Web container is installed is allocated to the Web server, a computer resource 3 on which an application container is installed is allocated to the application server, and a computer resource 3 on which a database management system is installed is allocated to the data server. It should be noted that the configuration of the application system is not limited to the Web 3-tier model, and the application system may be configured arbitrarily.

The load balancer 2 includes a distribution destination storage unit 21 to which information on the computer resources 3, to which the load balancer 2 can be connected, is registered, and an event monitoring section 22.

The load balancer 2 transmits a request transmitted from the router 4 to any computer resource 3 registered to the distribution destination storage unit 21 via the application network 6, and causes the computer resource 3 to process the request. Moreover, the load balancer 2 receives a processed result of a request from a computer resource 3 registered to the distribution destination storage unit 21 via the application network 6, and transmits the processed result to a source of a request via the router 4. Moreover, the load balancer 2 carries out processes such as updating of the distribution destination storage unit 21 according to an operation received from the policy execution device 1 via the management network 7.

The event monitoring section 22 monitors an event which occurs on the own load balancer 2, and notifies the policy execution device 1 of the generation of the event via the management network 7. According to this embodiment, the event monitoring section 22 monitors changes in the operation state (such as start and stop) of the own load balancer 2, and whether a load level exceeds a predetermined reference value or not, as events.

Other functions of the load balancer 2 are the same as those of load balancers used in a conventional load distribution system, and a detailed description thereof, therefore, is omitted.

The computer resource 3 processes a request received via the application network 6 according to an installed program, and transmits a result of the processing to a load balancer 2 or other computer resources 3 which constitute the application system along with the computer resource 3 itself. Moreover, the computer resource 3 controls execution of a program according to an operation received from the policy execution device 1 via the management network 7.

As illustrated, the computer resource 3 includes a network interface (IF) section 31 used to connect to the application network 6 and the management network 7, an event monitoring section 32, and a module execution section 33.

The event monitoring section 32 monitors an event which occurs on the own computer resource 3, and notifies the policy execution device 1 of the generation of the event via the management network 7. According to this embodiment, the event monitoring section 32 monitors changes in the operation state (such as start and stop) of the own computer resource 3, and whether a load level exceeds a predetermined reference value or not, as events.

The module execution section 33 processes a request received via the application network 6 according to an installed program, and transmits a result of the processing to a load balancer 2 or other computer resources 3 which constitute the application system along with the computer resource 3 via the application network 6.

It should be noted that the installed programs include a Web container, an application container, and a database management system in this embodiment. As described above, a computer resource 3 on which a Web container is installed is allocated to a Web server, a computer resource 3 on which an application container is installed is allocated to an application server, and a computer resource 3 on which a database management system is installed is allocated to a data server.

Other functions of the computer resource 3 are the same as those of computer resources used in a conventional load distribution system, and a detailed description thereof, therefore, is omitted.

The policy execution device 1 includes a network IF section 11 used to connect to the management network 7, an input/output section 12 which receives an instruction from the operator and displays information for the operator, a storage unit 13, and a calculation section 14.

The storage unit 13 includes a system logical configuration storage unit 131, a system configuration storage unit 132, a resource configuration storage unit 133, a policy storage unit 134, an action target instance storage unit 135, and a policy schedule storage unit 136. The respective storage units 131 to 136 will be described later.

The calculation section 14 includes a configuration management section 141, a policy setting section 142, a policy execution section 143, a policy scheduler section 144, and an event collection section 145. The respective processing sections 141 to 145 will be described later.

Figure 3:
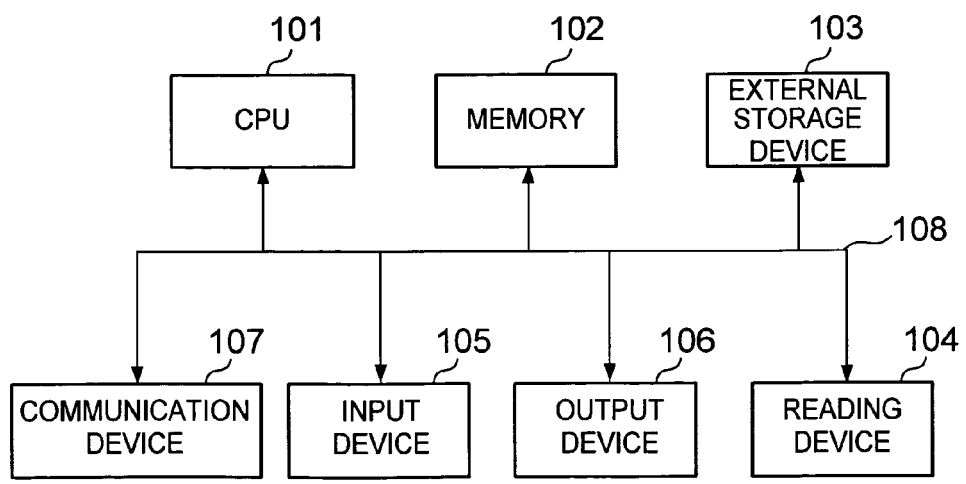
FIG. 3 is a diagram showing an example of a hardware configuration of a policy execution device.

FIG. 3 is a diagram of an example of a hardware configuration of the policy execution device 1. As illustrated, the policy execution device 1 according to this embodiment is realized by, on an ordinary computer including a CPU 101, a memory 102, an external storage device 103 such as an HDD, a reading device 104 which reads data from a storage medium such as a CD-ROM, a DVD-ROM, and an IC card, an input device 105 such as a keyboard and a mouse, an output device 106 such as a monitor and a printer, a communication device 107 for connection to the management network 7, a bus 108 which connects these respective devices with each other, causing the CPU 101 to execute a program loaded on the memory 102. The program may be downloaded on the external storage device 103 from a storage medium via the reading device 104, or the management network 7 via the communication device 107, may then be loaded on the memory 102, and may be executed by the CPU 101. Alternatively, the program may be directly loaded to the memory 102 without routing through the external storage device 103, and may be executed by the CPU 101. In this case, the memory 102 and/or the external storage device 103 are used as the storage unit 13. Moreover, the communication device 107 is used as the network IF section 11. Moreover, the input device 105 and the output device 106 are used as the input/output section 12.

A description will now be given of the respective storage units 131 to 136 provided in the storage unit 13.

The system logical configuration storage unit 131 stores logical class configuration tree information of the application system, and logical instance configuration tree information created by the operator from the logical class configuration tree information of the application system.

Figure 4:
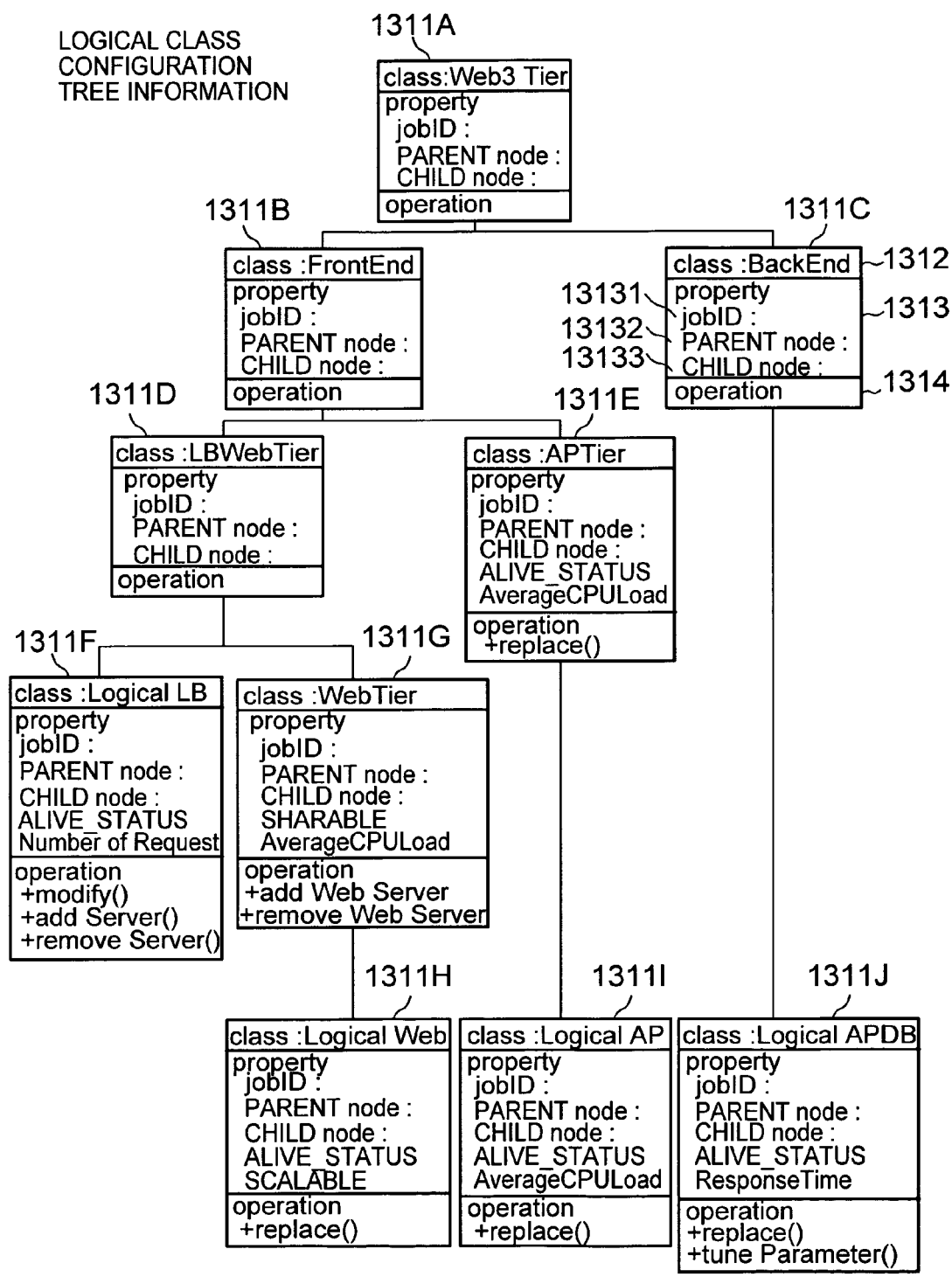
FIG. 4 is a schematic diagram showing logical class configuration tree information of the Web 3-tier model.

FIG. 4 is a schematic diagram of the logical class configuration tree information of the Web 3-tier model. As illustrated, the logical class configuration tree information is configuration information in a tree form representing a prototype of a application system following the Web 3-tier model, and includes multiple nodes (i.e., logical components) 1311A to 1311J. Respective nodes 1311A to 1311J include a "class" entry 1312, a "property" entry 1313, and an "operation" entry 1314 defining an operation (i.e., management operation) of the node.

A class name of a node is registered as a node name to the "class" entry 1312. In FIG. 4, the class name of the node 1311A is "Web3Tier", which represents a application system following the Web 3-tier model, the class name of the node 1311B is "Front End", which represents a front end tier, the class name of the node 1311C is "Back End", which represents a back end tier, the class name of the node 1311D is "LB Web Tier", which represents a Web tier with the load balancer, the class name of the node 1311E is "AP tier", which represents an AP tier, the class name of the node 1311F is "Logical LB", which represents a load balancer, the class name of the node 1311G is "Web Tier", which represents a Web server group which can be scaled out (management program of a blade system constructing the Web server group, for example), the class name of the node 1311H is "Logical Web", which represents a Web server, the class name of the node 1311I is "Logical AP", which represents an AP server, and the class name of the node 1311J is "Logical DB", which represents a DB server.

The "property" entry 1313 defines properties of a node. The "property" entry 1313 includes a "jobID" entry 13131, a "parent node" entry 13132, and a "child node" entry 13133 as required entries.

The "jobID" entry 13131 is an entry which is used in the logical class configuration tree information described later, and to which identification information of an instance of a application system to which this node belongs is registered. Therefore, the "jobID" entries 13131 of all the nodes 1311A to 1311J are in a null state in the logical class configuration tree information.

The "parent node" entry 13132 is an entry for registering a parent node. In FIG. 4, the node 1311A is a root node, and does not thus have a parent node. A parent node of the node 1311B is the node 1311A; 1311C, 1311A; 1311D, 1311B; 1311E, 1311B; 1311F, 1311D; 1311G, 1311D; 1311H, 1311G; 1311I, 1311E; and 1311J, 1311C.

The "child node" entry 13133 is an entry for registering a child node. In FIG. 4, child nodes of the node 1311A are the nodes 1311B and 1311C; 1311B, 1311D and 1311E; 1311C, 1311J; 1311D, 1311F and 1311G; 1311E, 1311I; and 1311G, 1311H. The nodes 1311F, 1311H, 1311I and 1311J are end nodes, and do not thus have child nodes.

The "property" entry 1313 includes entries defining attribute information to be managed by the node as additional properties. In FIG. 4, the node 1311E representing an AP tier includes an "ALIVE_STATUS" entry showing an alive status of the AP tier, and an "Average CPU Load" showing an average load of the CPU as additional properties. The node 1311F representing a load balancer includes an "ALIVE_STATUS" entry showing an alive status of the load balance, and a "Number of Request" entry showing the number of received requests of the load balancer as additional properties. The node 1311G representing a Web server group includes a "SHARABLE" entry showing that the node can be shared by other application systems, and an "Average CPU Load" representing an average load of the CPU as additional properties. The node 1311H representing a Web server includes an "ALIVE_STATUS" entry showing an alive status of the Web server, and a "SCALABLE" entry showing that the node can be scaled out as additional properties. The node 1311I representing an AP server includes an "ALIVE_STATUS" entry showing an alive status of the AP server, and an "Average CPU Load" showing an average load of the CPU as additional properties. The node 1311J representing a DB server includes an "ALIVE_STATUS" entry showing an alive status of the DB server, and a "Response Time" entry showing a response time of the DB server as additional properties.

The "operation" entry 1314 defines operations available on a node. The operations available on a node includes a monitoring operation for a component or an operation management operation such as deploy, start, stop, and un-deploy. The automatic execution system according to the present invention specifies the operations to the action entry of a policy, and then automatically executes the operations if trigger conditions of the policy are met.

In FIG. 4, the node 1311E includes "replace", which specifies replacing of a server, as an operation. The node 1311F includes "modify", which specifies setting of parameters such as a load distribution coefficient, "add Server", which specifies addition of a server, and "delete Server", which specifies removal of a server, as operations. The node 1311G includes "add Web Server", which specifies addition of a Web server, and "delete Web Server", which specifies removal of a Web server, as operations. The node 1311H includes "replace", which specifies replacement of a Web server, as an operation. The node 1311I includes "replace", which specifies replacement of an AP server, as an operation. The node 1311J includes "replace", which specifies replacement of a DB server, and "tune Parameter", which specifies a change of parameters of a database management system, as operations.

Figure 5:
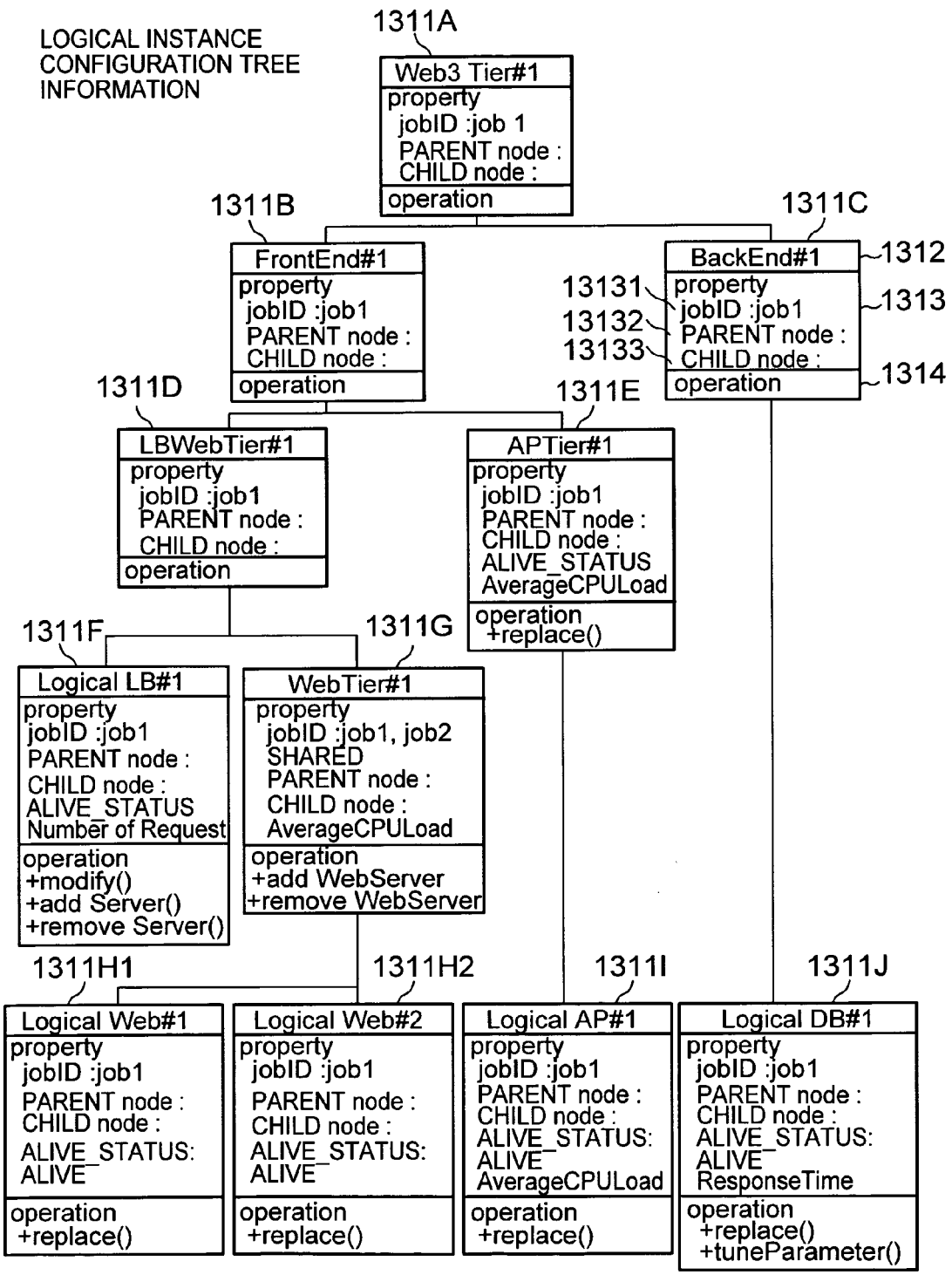
FIG. 5 is a schematic diagram showing logical instance configuration tree information created from the logical class configuration tree information shown in FIG. 4 by an operator.
Figure 6:
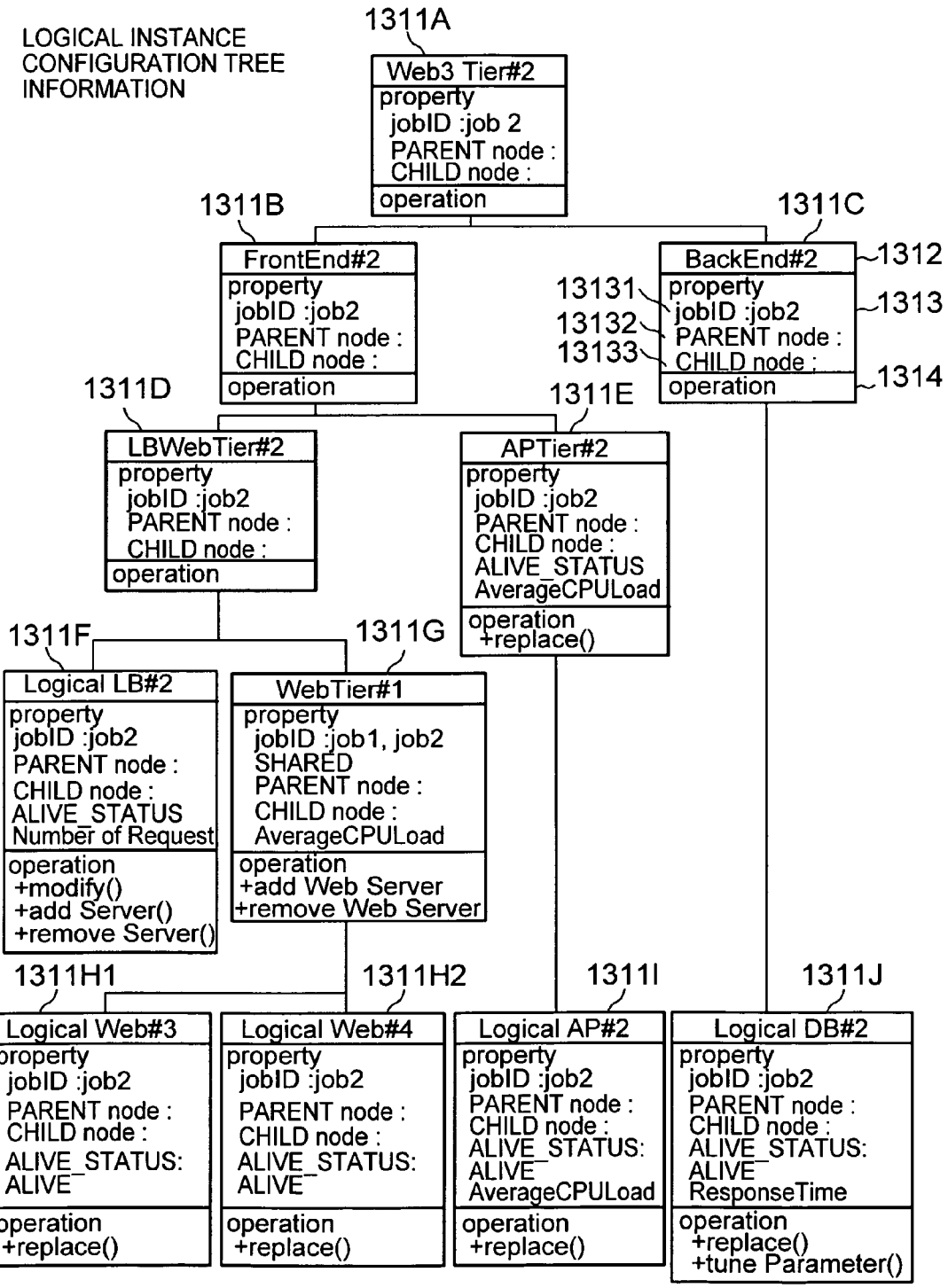
FIG. 6 is a schematic diagram showing logical instance configuration tree information created from the logical class configuration tree information shown in FIG. 4 by the operator.

FIGS. 5 and 6 are schematic diagrams of logical instance configuration tree information created from the logical class configuration tree information in FIG. 4 by the operator.

In the logical instance configuration tree information shown in FIG. 5, "job1" as identification information of an instance of a application system represented by this logical instance configuration tree information is registered to the "jobID" 13131 of the respective nodes 1311A to 1311J in the logical class configuration tree information shown in FIG. 4. Moreover, "job2", which is identification information of an instance of a application system represented by the logical instance configuration tree information shown in FIG. 6, is also registered to the node 1311G in addition to "job1". On the other hand, in the logical instance configuration tree information shown in FIG. 6, "job2" as the identification information of the instance of the application system represented by this logical instance configuration tree information is registered to the "jobID" 13131 of the respective nodes 1311A to 1311J in the logical class configuration tree information shown in FIG. 4. Moreover, "job1", which is identification information of an instance of a application system represented by the logical instance configuration tree information shown in FIG. 5, is also registered to the node 1311G in addition to "job2". Namely, the node 1311G is shared by both the instance of the application system represented by the logical instance configuration tree information shown in FIG. 5, and the instance of the application system represented by the logical instance configuration tree information shown in FIG. 6 according to the additional property "SHARABLE" in the logical class configuration tree information shown in FIG. 4.

Two nodes 1311H1 and 1311H2 of the Web server are respectively provided according to the property "SCALABLE" of the node 1311H in the logical instance configuration tree information in FIGS. 5 and 6. Moreover, initial values are set to the additional properties of the respective nodes 1311A to 1311J. For example, "ALIVE" representing an alive status is set to "ALIVE_STATUS".

An instance name is set as a node name to the entry 1312 of the respective nodes 1311A to 1311J in the logical instance configuration tree information shown in FIGS. 5 and 6. Namely, the entry 1312 defined as "class" in the logical class configuration tree information is defied as "instance" in the logical instance configuration tree information.

In FIG. 5, the instance name of the node 1311A is "Web 3 Tier#1", which represents a application system following the Web 3-tier model, the instance name of the node 1311B is "Front End#1", which represents a front end tier, the instance name of the node 1311C is "Back End#1", which represents aback end tier, the instance name of the node 1311D is "LB Web Tier#1", which represents a Web tier with a load balancer, the instance name of the node 1311E is "AP tier#1", which represents an AP tier, the instance name of the node 1311F is "Logical LB#1", which represents a load balancer, the instance name of the node 1311G is "Web Tier#1", which represents a Web server group which can be scaled out (management program of a blade system constructing the Web server group, for example), the instance name of the node 1311H1 is "Logical Web#1", which represents a Web server, the instance name of the node 1311H2 is "Logical Web#2", which represents a Web server, the instance name of the node 1311I is "Logical AP#1", which represents an AP server, and the instance name of the node 1311J is "Logical DB#1", which represents a DB server.

In FIG. 6, the instance name of the node 1311A is "Web 3 Tier#2", which represents a application system following the Web 3-tier model, the instance name of the node 1311B is "Front End#2", which represents a front end tier, the instance name of the node 1311C is "Back End#2", which represents aback end tier, the instance name of the node 1311D is "LB Web Tier#2", which represents a Web tier with a load balancer, the instance name of the node 1311E is "AP tier#2", which represents an AP tier, the instance name of the node 1311F is "Logical LB#2", which represents a load balancer, the instance name of the node 1311G is "Web Tier#2", which represents a Web server group which can be scaled out (management program of a blade system constructing the Web server group, for example), the instance name of the node 1311H1 is "Logical Web#3", which represents a Web server, the instance name of the node 1311H2 is "Logical Web#4", which represents a Web server, the instance name of the node 1311I is "Logical AP#2", which represents an AP server, and the instance name of the node 1311J is "Logical DB#2", which represents a DB server.

Figure 7:
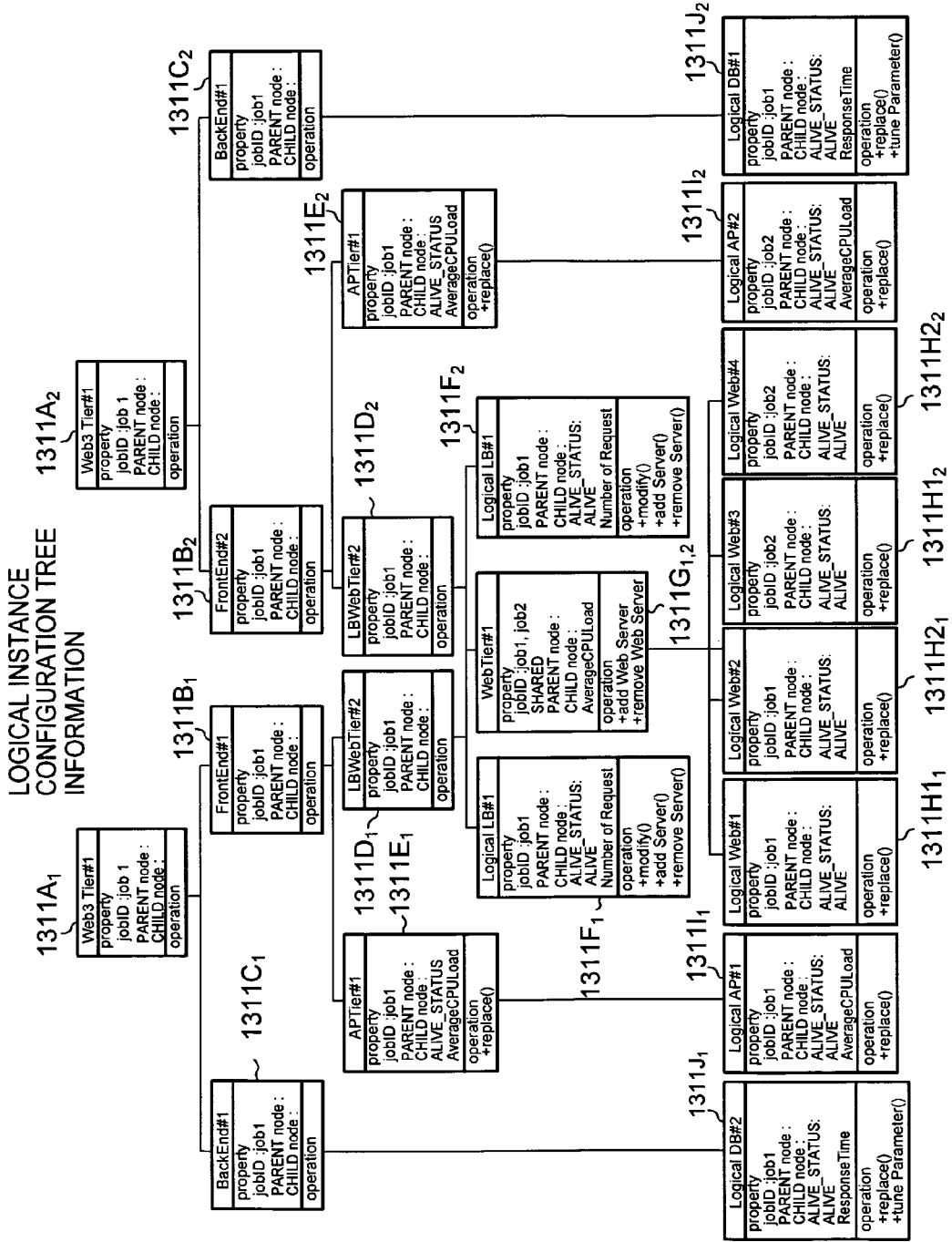
FIG. 7 is a diagram showing the logical instance configuration tree information shown in FIGS. 5 and 6 combined into one piece of logical instance configuration tree information.

If the respective pieces of the logical instance configuration tree information shown in FIGS. 5 and 6 are created from the logical class configuration tree information shown in FIG. 4, and are stored in the system logical configuration storage unit 131, the two pieces of the logical instance configuration tree information stored in the system logical configuration storage unit 131 is represented as one piece of combined logical instance configuration tree information having the node 1311G as a connection point as shown in FIG. 7. An appendix "1" is added to the nodes in the logical instance configuration tree information shown in FIG. 5, and an appendix "2" is added to the nodes in the logical instance configuration tree information shown in FIG. 6. Since the node 1311G is a node of both the logical instance configuration tree information shown in FIG. 5 and the logical instance configuration tree information shown in FIG. 6, an appendix "1,2" is added.

A continuing description will be given with reference again to FIG. 1. The system configuration storage unit 132 stores system configuration tree information. The system configuration tree information is constructed by assigning physical components constituting the information system as child nodes of the respective end nodes (i.e., nodes having an instance name "Logical**#*") of the logical instance configuration tree information.

Figure 8:
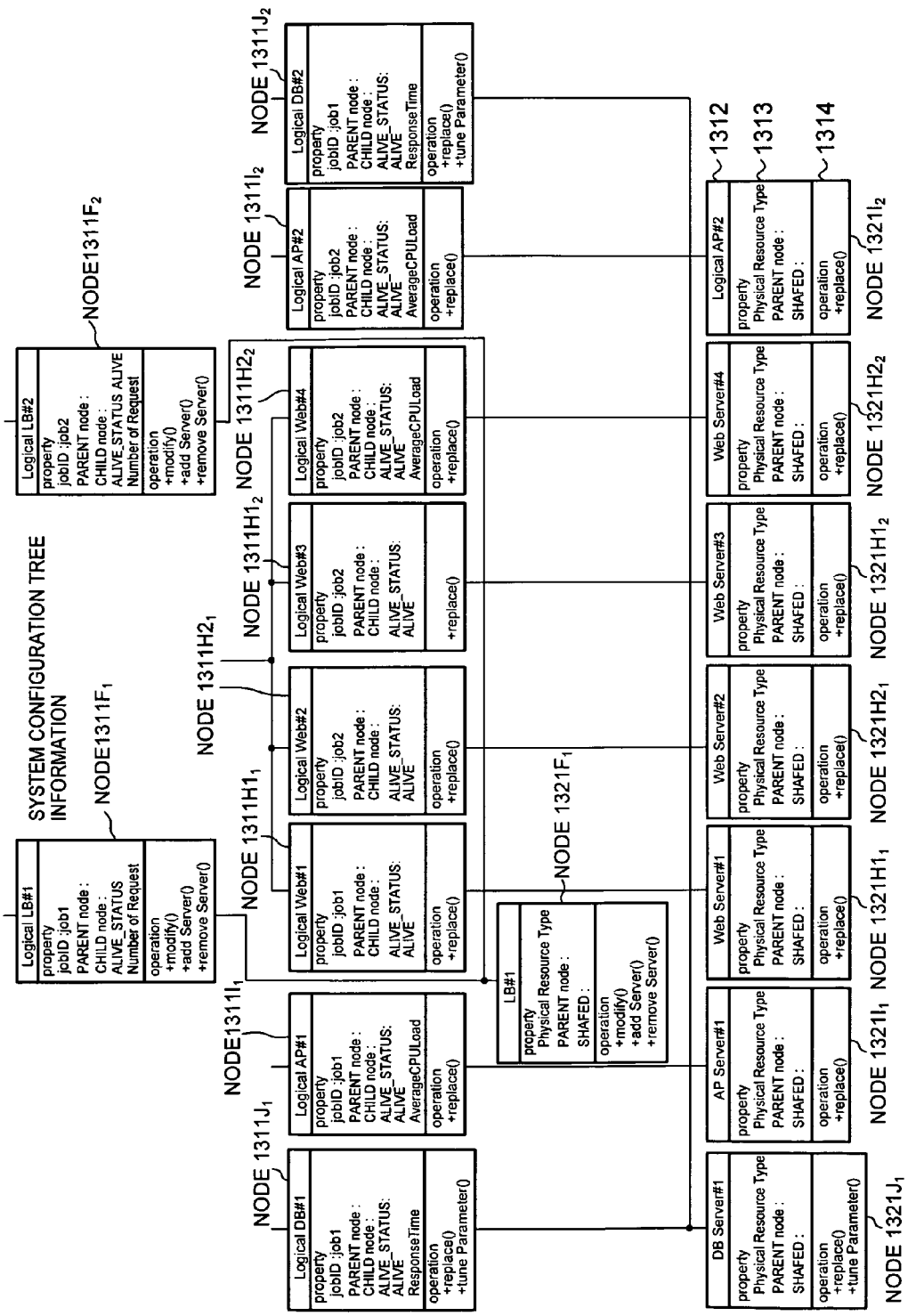
FIG. 8 is a schematic diagram showing system configuration tree information.

FIG. 8 is a schematic diagram of the system configuration tree information. FIG. 8 shows an example of the system configuration tree information created from the logical instance configuration tree information shown in FIG. 7. For the sake of easy comprehension, the respective nodes upstream of the end nodes of the logical instance configuration tree information shown in FIG. 7 are omitted.

In FIG. 8, a node 1321J$_1$ is a physical component (i.e., computer resource 3) allocated commonly to a node 1311J$_1$ (having the instance name "Logical DB#1") and a node 1311J$_2$ (having the instance name "Logical DB#2"), "DB server#1" indicating a DB server is described in the "instance" entry 1312, the parent nodes "node 1311J$_1$" and "node 1311J$_2$", "SHARED" indicating that the node is shared, and "Physical Resource Type" specifying identification information (i.e., resource ID) of the allocated physical resource are described in the "property" entry 1313, and "replace" instructing replacement of a DB server, and "tune Parameter" instructing parameter change of a database management system are described in the "operation" entry 1314.

A node 1321I$_1$ is a physical component (i.e., computer resource 3) allocated to a node 1311I$_1$ (having the instance name "Logical AP#1"), "AP server#1" indicating an AP server is described in the "instance" entry 1312, the parent node "node 1311I$_1$", and "Physical Resource Type" specifying identification information of the allocated physical resource are described in the "property" entry 1313, and "replace" instructing replacement of an AP server is described in the "operation" entry 1314. A node 1321I$_2$ is a physical component (i.e., computer resource 3) allocated to a node 1311I$_2$ (having the instance name "Logical AP#2"), "AP server#2" indicating an AP server is described in the "instance" entry 1312, the parent node "node 1311I$_2$", and "Physical Resource Type" specifying identification information of the allocated physical resource are described in the "property" entry 1313, and "replace" instructing replacement of a Web server is described in the "operation" entry 1314.

A node 1321H1$_1$ is a physical component (i.e., computer resource 3) allocated to a node 1311H1$_1$ (having the instance name "Logical Web#1"), "Web server#1" indicating a Web server is described in the "instance" entry 1312, the parent node "node 1311H1$_1$", and "Physical Resource Type" specifying identification information of the allocated physical resource are described in the "property" entry 1313, and "replace" instructing replacement of a Web server is described in the "operation" entry 1314. A node 1321H2₁ is a physical component (i.e., computer resource 3) allocated to a node 1311H2₁ (having the instance name "Logical Web#2"), "Web server#2" indicating a Web server is described in the "instance" entry 1312, the parent node "node 1311H2₁", and "Physical Resource Type" specifying identification information of the allocated physical resource are described in the "property" entry 1313, and "replace" instructing replacement of a Web server is described in the "operation" entry 1314. A node 1321H1₂ is a physical component (i.e., computer resource 3) allocated to anode 1311H1₂ (having the instance name "Logical Web#3"), "Web server#3" indicating a Web server is described in the "instance" entry 1312, the parent node "node 1311H1₂", and "Physical Resource Type" specifying identification information of the allocated physical resource are described in the "property" entry 1313, and "replace" instructing replacement of a Web server is described in the "operation" entry 1314. A node 1321H2₂ is a physical component (i.e., computer resource 3) allocated to a node 1311H2₂ (having the instance name "Logical Web#4"), "Web server#4" indicating a Web server is described in the "instance" entry 1312, the parent node "node 1311H2₂", and "Physical Resource Type" specifying identification information of the allocated physical resource are described in the "property" entry 1313, and "replace" instructing replacement of a Web server is described in the "operation" entry 1314.

A node 1321F₁ is a physical component (i.e., load balancer 2) allocated commonly to a node 1311F₁ (having the instance name "Logical LB#1") and a node 1311F₂ (having the instance name "Logical LB#2"), "LB#1" indicating a load balancer is described in the "instance" entry 1312, the parent nodes "node 1311F₁" and "node 1311F₂", "SHARED" indicating that the node is shared, and "Physical Resource Type" specifying identification information of the allocated physical resource are described in the "property" entry 1313, and "modify" instructing setting of parameters such as the load distribution coefficient, "add Server" instructing addition of a server, and "delete Server" instructing removal of a server are described in the "operation" entry 1314.

A continuing description will be given with reference again to FIG. 1. The resource configuration storage unit 133 stores resource information including information on allocation to the application system respectively for all the physical resources (i.e., load balancers 2 and the computer resources 3) to be managed by the policy execution device 1.

FIG. 9 is a schematic diagram of registered contents of the resource configuration storage unit 133. As illustrated, a record 1330 is registered to the resource configuration storage unit 133 for the respective physical resources constituting the information system. The record 1330 includes a field 1331 to which a resource ID, which is identification information of a physical resource, is registered, a field 1332 to which a class name of a logical component to which this physical resource can be allocated is registered, and a field 1333 to which identification information of an instance of a application system allocated to this physical resource is registered. "Not allocated" indicating that a pooled physical resource is not allocated is registered to the field 1333 of the record 1330 of this physical resource.

The policy storage unit 134 stores policy definition information, and at least policy instance information created by the operator from the policy definition information.

Figure 10:
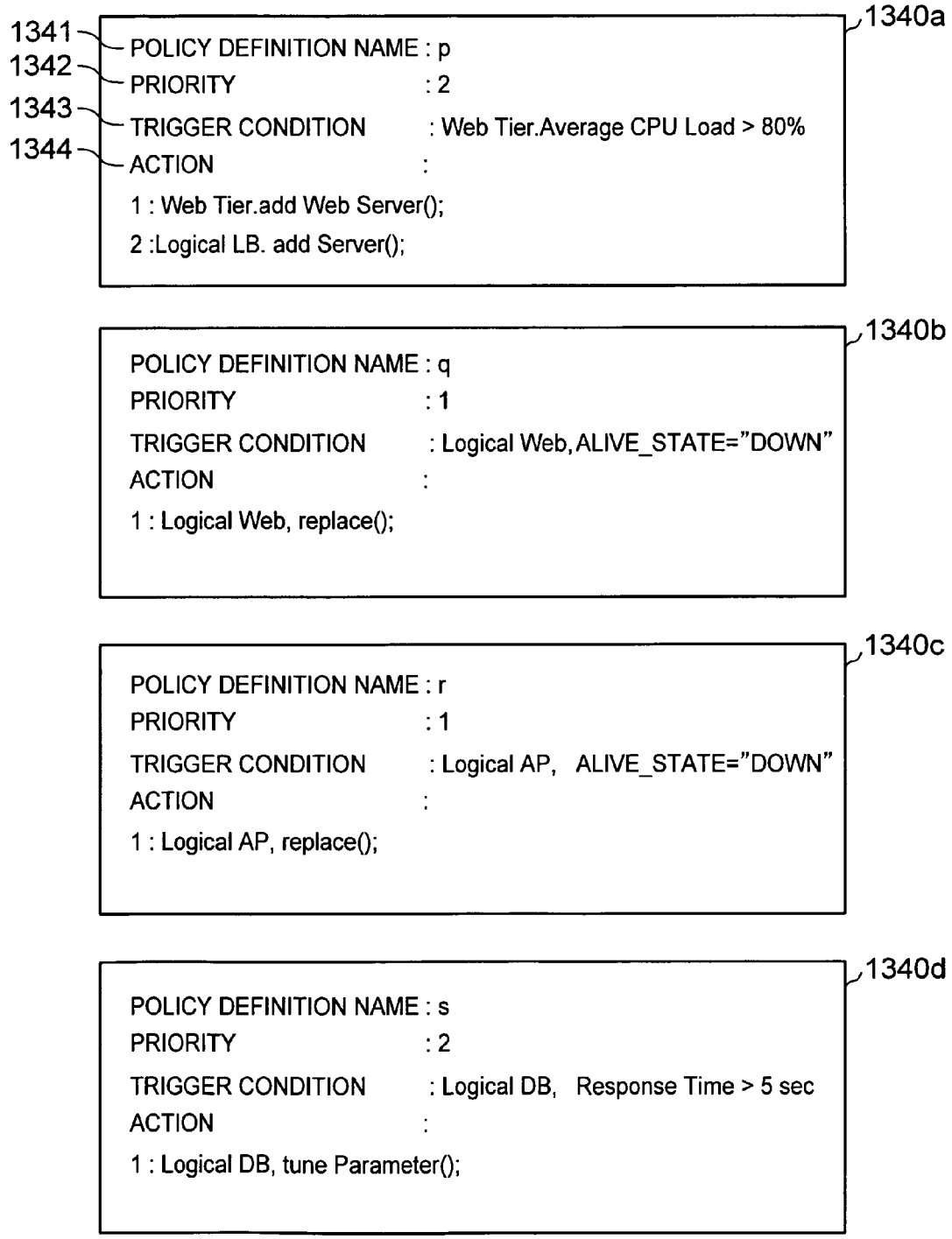
FIG. 10 is a schematic diagram showing policy definition information.

FIG. 10 is a schematic diagram of the policy definition information. As illustrated, the policy definition information 1340x includes an entry 1341 describing a definition name of a policy, an entry 1342 describing a priority of the policy execution, an entry 1343 describing trigger conditions, and an entry 1344 describing actions.

In FIG. 10, policy definition information 1340a has a definition name "p", a priority "2" for the concurrency control, a trigger condition of "a property 'Average CPU Load' of a node with a class name 'Web Tier' is more than 80%", and, if the trigger condition is met, an action of "an operation 'add Web Server' for a node with a class name 'Web Tier', and an operation 'add Server' for a node with a class name 'Logical LB'".

Policy definition information 1340b has a definition name "q", a priority "1" for the concurrency control, a trigger condition of "a property 'ALIVE_STATE' of a node with a class name 'Logical Web' is down", and if the trigger condition is met, an action of "an operation 'replace' for a node with a class name 'Logical LB'".

Policy definition information 1340c has a definition name "r", a priority of "1" for the concurrency control, a trigger condition of "a property 'ALIVE_STATE' of a node with a class name 'Logical AP' is down", and, if the trigger condition is met, an action of "an operation 'replace' for anode with a class name 'Logical AP'".

Policy definition information 1340d has a definition name "s", a priority "3" for the concurrency control, a trigger condition of "a property 'Response Time' of a node with a class name 'Logical DB' exceeds 5 seconds", and, if the trigger condition is met, an action of "an operation 'tune Parameter' for a node with the a name 'Logical DB'".

The policy instance information is instantiated policy definition information to apply to a application system. According to this embodiment, the identification information of a policy instance is represented in a form of a concatenation of a combination of identification information of an instance of a application system to which this policy instance is applied and a definition name of policy definition information from which the policy instance information is instantiated, a connector "#", and a serial number for identifying the policy instance among the same combinations. For example, if a policy instance created from policy definition information with a definition name "p" is set to an instance "job1" of a application system, identification information thereof is "job1.p#1". It should be noted that policy instance information is instantiated policy definition information. Thus, nodes in the logical instance configuration tree information which are instantiated from the logical class configuration tree information are specified as targets of trigger conditions and actions in a policy instance. For example, if the "Web Tier" class is specified in policy definition information, "Web Tier#1", which is an instance of this class, is specified in policy instance information.

The action target instance storage unit 135 stores an action target instance list including instance names of nodes in the system configuration tree information influenced if actions of policy instance information are taken for respective pieces of policy instance information. An action target instance name is an instance name instantiated from a component if an operation for monitoring the component such as the CPU, the disk, and the I/O device, is specified, for example. If the action entry is monitoring of the CPU, an instance instantiated from the class of the component representing the CPU is described. If an operation management operation such as deploy, start, stop, and un-deploy is specified in the action entry of a policy, an instance instantiated from a class of a component including the operation management operation is described.

FIG. 11 is a schematic diagram of registered contents of the action target instance storage unit 135. As illustrated, the action target instance storage unit 135 stores a record 1350 for respective pieces of policy instance information stored in the policy storage unit 134. The record 1350 includes a field 1351 to which identification information of policy instance information is registered, and a field 1352 to which instance names of nodes (referred to as action target instances) of system configuration tree information influenced if actions of this policy instance information are taken, are registered (targets of an operation, for example). For example, in FIG. 11, policy instance information "JOB1.q#1" includes two action target instances "Logical Web#1" and "Web Server#1".

The policy schedule storage unit 136 stores schedules of policy instances to be executed.

FIG. 12 is a schematic diagram of registered contents of the policy schedule storage unit 136. As illustrated, the policy schedule storage unit 136 stores a record 1360 for respective policy instances to be executed. The record 1360 includes a field 1361 to which identification information of policy instance information is registered, a field 1362 to which date and time when trigger conditions of the policy instance information are met, are registered, a field 1363 to which the priority of the policy instance information is registered, and a field 1364 to which an execution state of the policy instance information is registered. According to this embodiment, three execution states, i.e., "READY" indicating a state ready for execution, "WAITING" indicating a state of waiting for execution, and "RUNNING" indicating a state of running are used as the execution states registered to the field 1364.

A continuing description will be given with reference again to FIG. 1. The calculation section 14 includes the configuration management section 141, the policy setting section 142, the policy execution section 143, the policy scheduler section 144, and the event collection section 145.

The configuration management section 141 shows logical class configuration tree information stored in the system logical configuration storage unit 131 on the input/output section 12, receives logical instance configuration tree information, which is obtained by instantiating respective nodes of the logical class configuration tree information by means of editing, from the operator via the input/output section 12, and stores the logical instance configuration tree information in the system logical configuration storage unit 131. Moreover, the configuration management section 141 executes a system configuration tree information creation process, a system configuration tree information change process, and a configuration reflection process, which are described later.

The policy setting section 142 shows the policy definition information stored in the policy storage unit 134 on the input/output section 12, receives policy instance information obtained by instantiating the policy definition information by means of editing via the input/output section 12 from the operator, and stores the policy instance information in the policy storage unit 134. Moreover, the policy setting section 142 executes an action target instance list creation process, which is described later.

The policy execution section 143, along with the policy scheduler section 144, executes a policy execution process, which is described later. The event collection section 145 collects event information from the load balancers 2 and the computer resources 3 via the network IF section 11.

A description will now be given of an operation of the policy execution device 1 with the above configuration.

FIG. 13 is a flowchart describing an operation outline of the policy execution device 1. This flowchart assumes that the logical instance configuration tree information and the policy instance information created by the operator are already stored respectively in the system logical configuration storage unit 131 and the policy storage unit 134.

First, the configuration management section 141 executes the system configuration tree information creation process to create system configuration tree information from the logical instance configuration tree information stored in the system logical configuration storage unit 131 and the resource information stored in the resource configuration storage unit 133, and stores the system configuration tree information in the system configuration storage unit 132 (S1).

Then, the configuration management section 141 executes the configuration reflection process to allocate the physical resources (i.e., load balancers 2 and computer resources 3) of the information system to instances of the application system according to the system configuration tree information stored in the system configuration storage unit 132 (S2).

Then, the policy setting section 142 executes the action target instance list creation process to create a target instance list for respective policy instances stored in the policy storage unit 134, and stores the created action target instance lists in the action target instance storage unit 135 (S3).

After the action target instance storage unit 135 stores the action target instance lists for the respective pieces of the policy instance information, the policy executing section 143 cooperates with the policy scheduler section 144, which realizes the concurrency control of policy instances, to execute a policy execution process, thereby carrying out actions of policy instance information having trigger conditions applicable to events collected from the information system (S4).

If it is necessary to change the system configuration tree information after the actions of the policy instance information are executed, the configuration management section 141 executes the system configuration tree information change process, and reflects the changes in the system configuration tree information stored in the system configuration storage unit 132 (S5). Then, the process returns to the step S2.

Figure 14:
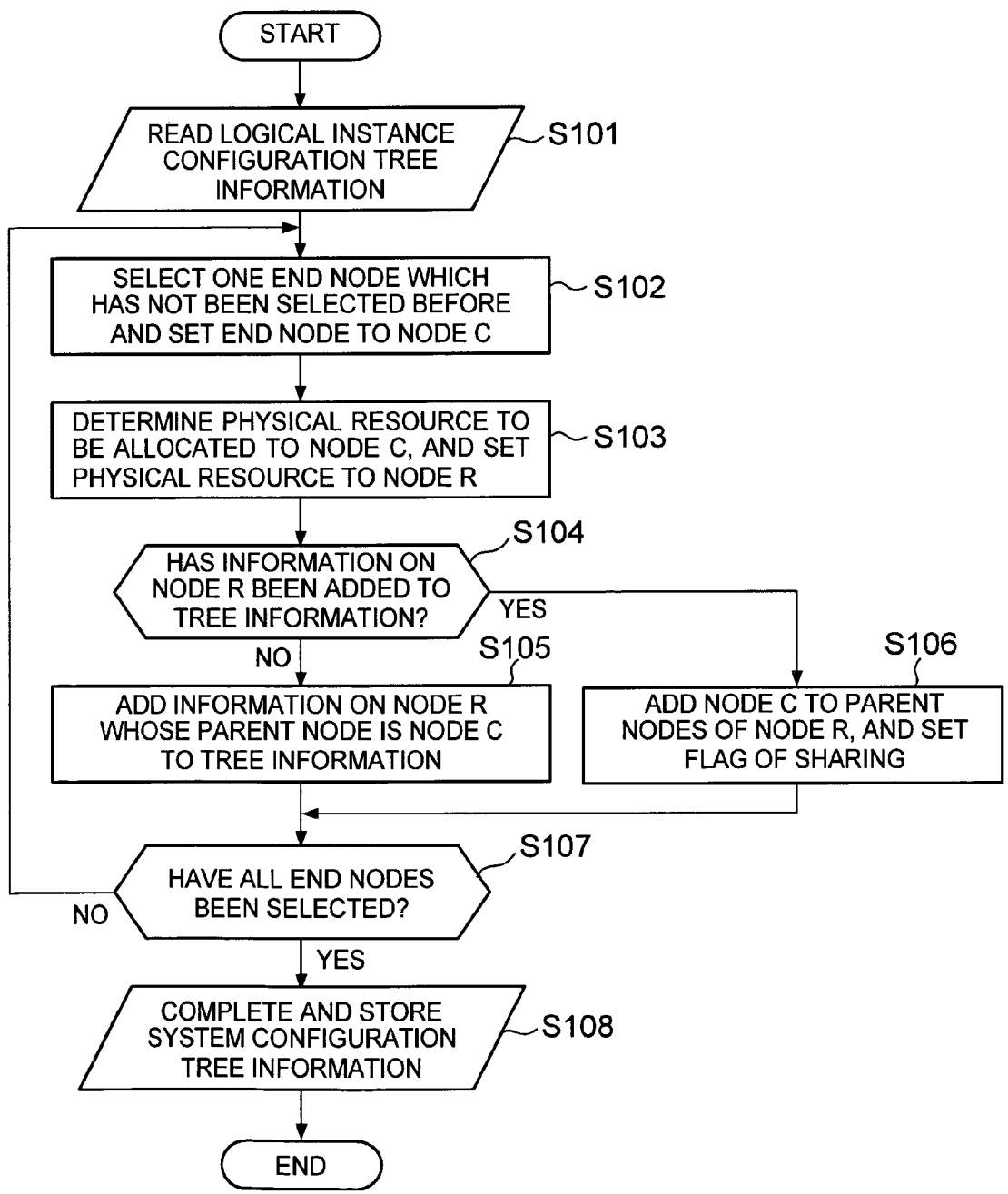
FIG. 14 is a flowchart explaining a system configuration tree information creation process shown in FIG. 13.

FIG. 14 is a flowchart describing the system configuration tree information creation process (S1) shown in FIG. 13.

First, the configuration management section 141 reads the logical instance configuration tree information (refer to FIG. 7) from the system logical configuration storage unit 131 (S101). Then, the configuration management section 141 selects one end node which does not have child nodes (has an instance name "Logical **#*"), and has not been selected yet from the read logical instance configuration tree information, and sets this node to a node C (S102). For example, the end node $1311F_1$ having the instance name "Logical LB#1" in FIG. 7 is selected as the node C.

Then, the configuration management section 141 refers to the resource configuration storage unit 133, determines a physical resource to be allocated to the node C from the physical resources constituting the information system, and designates the determined resource as a node R (S103). To be specific, the configuration management section 141 identifies a name of a class from which the instance whose name the node C carries is instantiated, and selects a record 1330 to be allocated to the node C from the records 1330 of the resource information having a field 1332 to which the class name is registered. It should be noted that an instance name of a node is generated by adding "#serial number" to a name of a class of a node from which the instance is instantiated according to this embodiment. Therefore, the class name from which the instance is instantiated can be easily obtained by removing "#serial number" from the instance name of a node.

Then, the configuration management section 141 determines whether the node R has already been added to the logical instance configuration tree information (S104). To be specific, the configuration management section 141 determines whether an instance name of a application system is registered to the field 1333 of the record 1330 of the resource information selected in the step S103. If an instance name is not registered, the node R has not been to added to the logical instance configuration tree information. In this case (NO in the step S104), information of the node R is created from information of the node C, and is added to the logical instance configuration tree information (S105).

Figure 15:
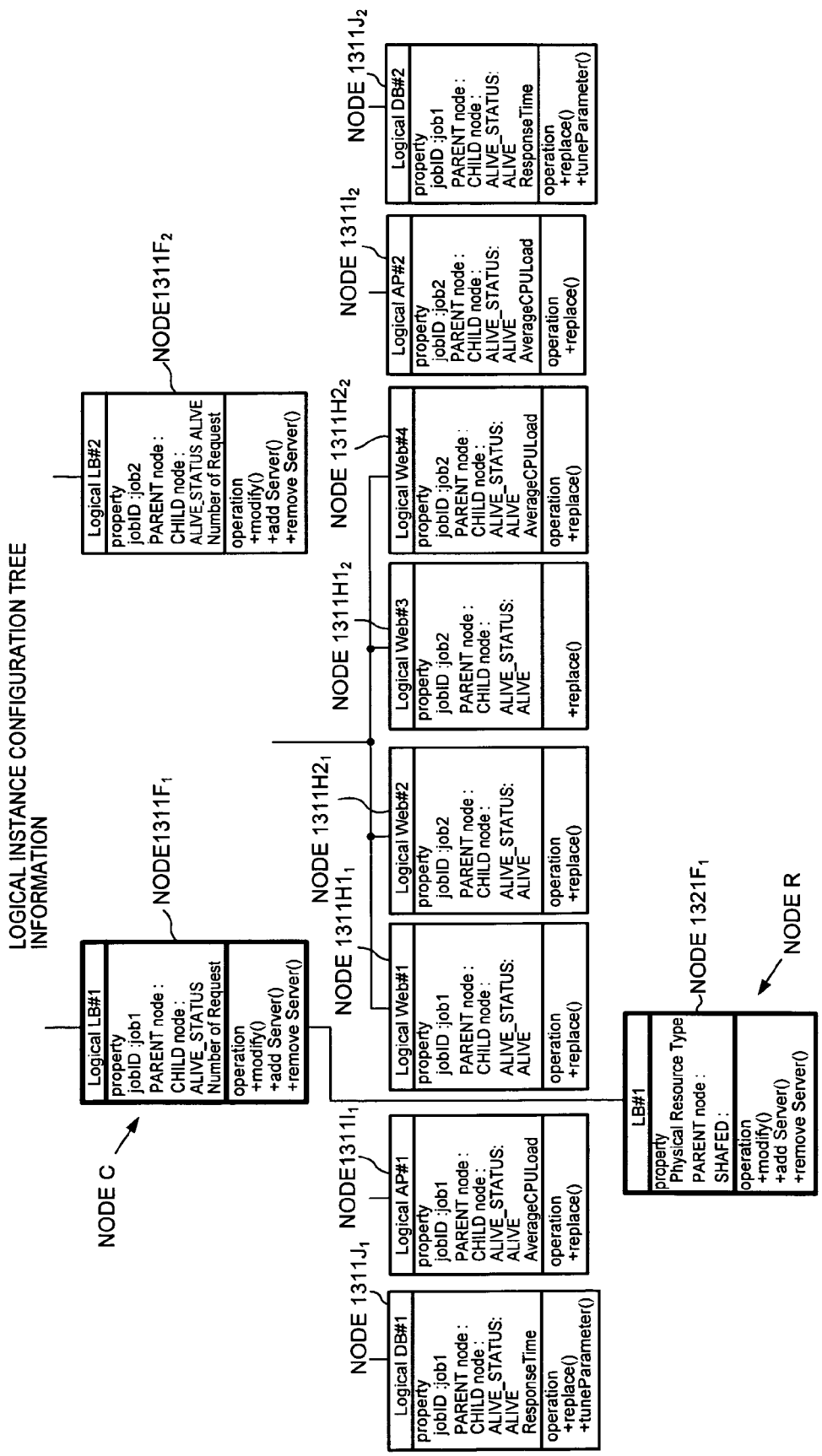
FIG. 15 is a diagram explaining the system configuration tree information creation process shown in FIG. 13.

To be specific, the instance name of the node R is created from the instance name of the node C. For example, as illustrated in FIG. 15, the instance name of the node R is created by removing "Logical", which indicates that the instance is a logical component, from the instance name "Logical LB#1" of the node C. Moreover, the configuration management section 141 sets a resource ID registered to the field 1331 of the selected record 1330 to "Physical Resource Type" as a property of the node R, sets the node C (node $1311F_1$) to the parent node, and copies operations of the node C as operations of the node R. Moreover, the configuration management section 141 registers the identification information of the instance of the application system described in the property of the node C to the field 1333 of the record 1330 of the resource information selected in the step S103. Then, the process proceeds to a step S107.

On the other hand, if an instance name of a application system is registered to the field 1333 of the record 1330 of the resource information selected in the step S103, the node R has already been added to the logical instance configuration tree information. In this case (YES in the step S104), the configuration management section 141 searches the logical instance configuration tree information for information on the node R, adds the description of the node C to the parent node as a property of the node R, and adds a description "SHARED" indicating that the node R is shared by multiple instances of application systems (S106).

Figure 16:
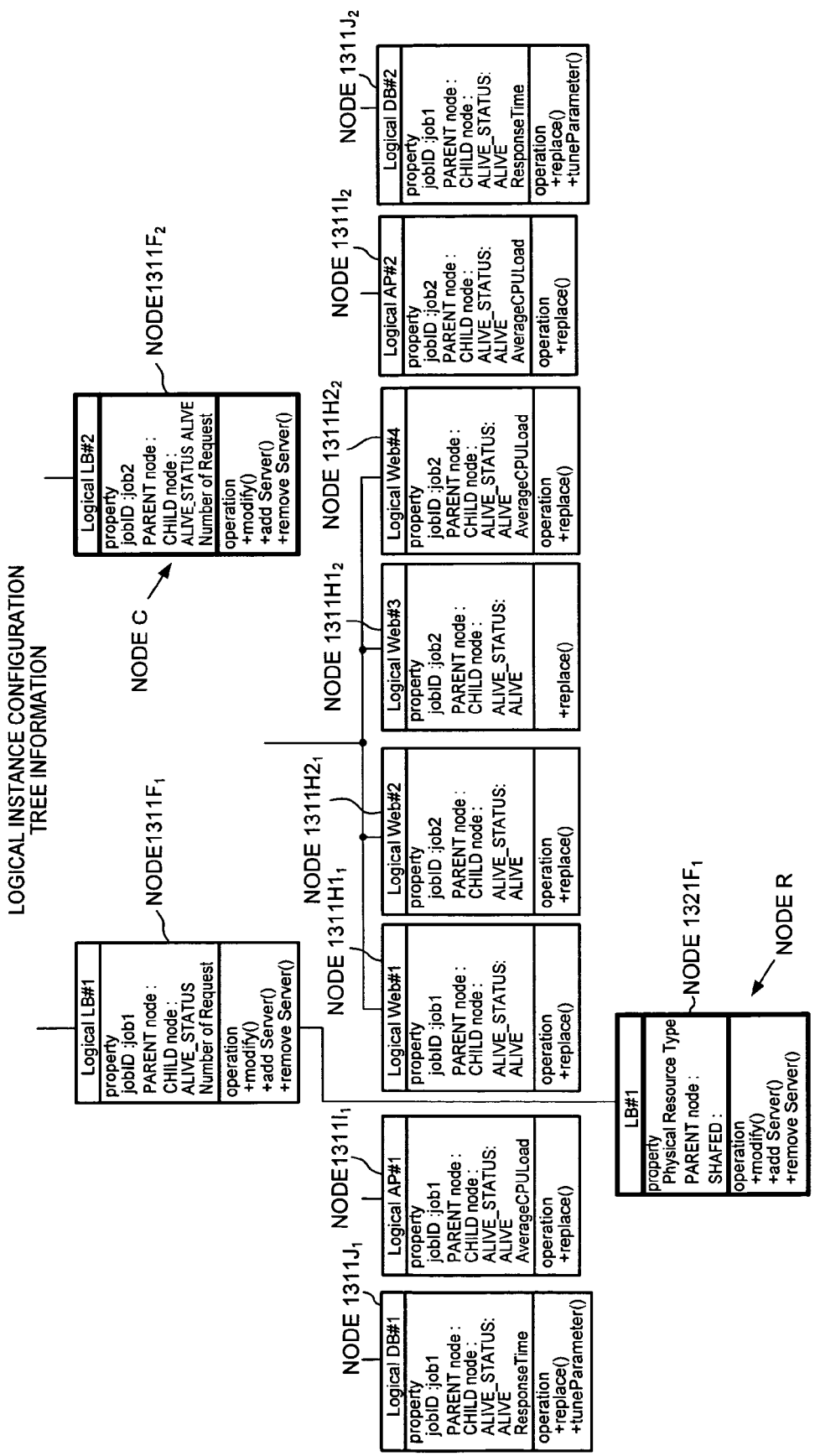
FIG. 16 is a diagram explaining the system configuration tree information creation process shown in FIG. 13.

To be specific, the logical instance configuration tree information is searched for a node which has a resource ID, which is registered to the field 1331 of the selected record 1330 of the resource information in the step S103, as a property. For example, as shown in FIG. 16, if the node C is the node $1311F_2$, and the node R has been added to the logical instance configuration tree information as a child node of the node $1311F_1$, the configuration management section 141 searches for the node R which has the resource ID of the selected record 1330 as a property. Then, the configuration management section 141 adds the description of the node C to the parent node as the property of the searched node R, and adds a property "SHARED". Moreover, the configuration management section 141 registers the identification information of the instance of the application system described in the property of the node C to the field 1333 of the record 1330 of the resource information selected in the step S103. Then, the process proceeds to a step S107.

In the step S107, the configuration management section 141 determines whether all the end nodes in the logical instance configuration tree information have been selected. If there are end nodes which have not been selected (NO in the step S107), the process returns to the step S102. On the other hand, if all the end nodes have been selected (YES in the step S107), the logical instance configuration tree information to which the nodes of the physical resources have been added as described above is registered as the system configuration tree information to the system configuration storage unit 133 (S108).

Figure 17:
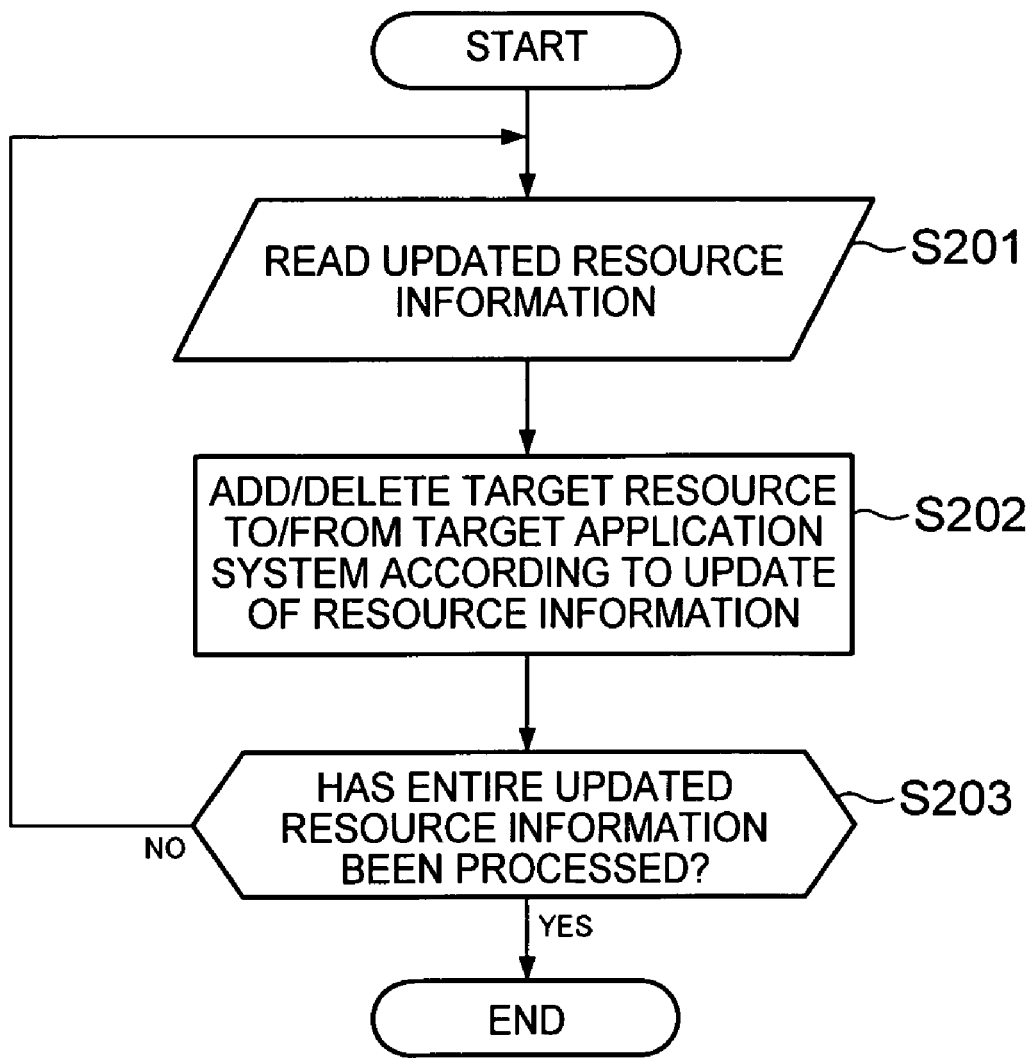
FIG. 17 is a flowchart explaining a configuration reflection process shown in FIG. 13.

FIG. 17 is a flowchart describing the configuration reflection process (S2) shown in FIG. 13.

First, the configuration management section 141 refers to the resource configuration storage unit 133, and detects a record 1330 of the resource information with an updated field 1333 (S201).

Then, the configuration management section 141 searches the system configuration tree information of the system configuration storage unit 132 for a node having a resource ID (a physical resource having this resource ID is referred to as target resource) registered to the field 1331 of the detected record 1330 as a property. Moreover, the configuration management section 141 searches for other records 1330 of the resource information which have the field 1333 to which an instance name of the application system (referred to as target application system) added to or deleted from the field 1333 of the detected record 1330 is registered, and searches the system configuration tree information for respective nodes having the resource ID registered to the field 1331 of the respective searched records 1330 as a property (referred to as related resources) (nodes of other physical resources allocated to the target application system). Then, the configuration management section 141 notifies the target resources of node information of the target resources along with node information of the respective related resources. Moreover, the configuration management section 141 notifies the respective related resources of the node information of the target resource. In this way, the configuration management section 141 adds or deletes the target resource to or from the target application system (S202). The existing grid computing technology can be applied to this process for addition and deletion, and hence detailed description thereof is omitted.

Then, if there are records 1330 for which the processing in the step S202 have not been carried out in the records 1330 of the resource information whose field 1333 has been updated (YES in the step S203), the process returns to the step S201, and continues the process. Otherwise (NO in the step S203), the configuration management section 141 completes this process.

Figure 18:
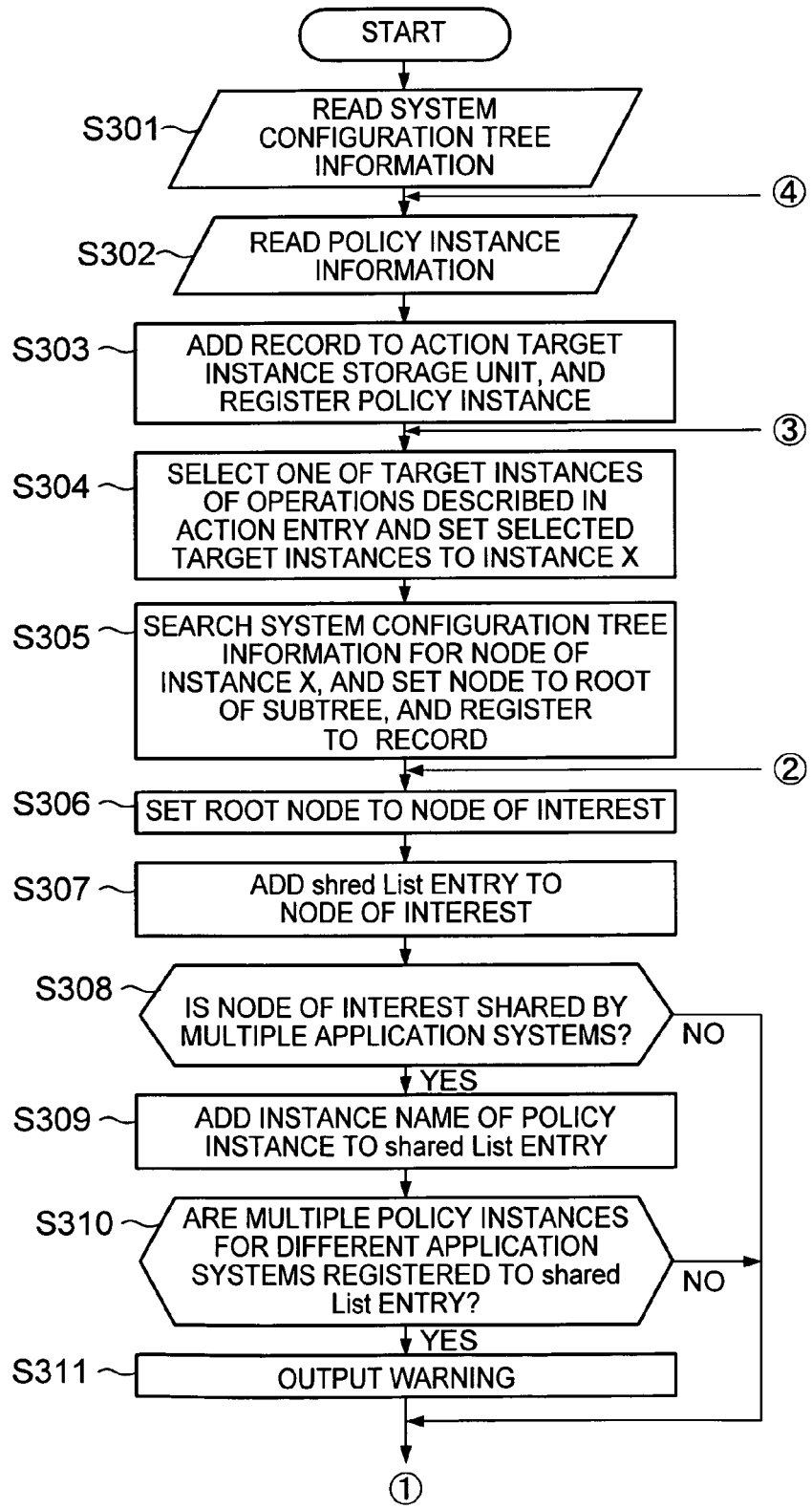
FIG. 18 is a flowchart explaining an action target instance creation process shown in FIG. 13.

FIGS. 18 and 19 are flowcharts describing the action target instance creation process (S3) shown in FIG. 13.

First, the policy setting section 142 clears registered contents in the action target instance storage unit 135, and reads out the system configuration tree information (refer to FIG. 8) from the system configuration storage unit 132 (S301). The policy setting section 142 reads out one piece of unprocessed policy instance information from the policy storage unit 134 (S302). Then, the policy setting section 142 adds the new record 1350 to the action target instance storage unit 135, and registers identification information of the read policy instance to the field 1351 of this record 1350 (S303).

Then, the policy setting section 142 selects one of target instances of operations described in the action entry of the read policy instance, and designates the selected instance to an instance X (S304). For example, it is assumed that policy instance information 1341 shown in FIG. 20 is read from the policy storage unit 134 in the step S302. In this case, a target instance "Web Tier#1", which is described in a first operation in the action entry is designated as the instance X.

Then, the policy setting section 142 searches the read system configuration tree information for a node of the instance X, and sets this node as a root node of a subtree. Then, the policy setting section 142 registers the instance name of this node to the field 1352 of the added record 1350 (S305). For example, if the system configuration tree information shown in FIG. 8 is read, and the instance X is "Web Tier#1" in the step S301, the subtree is a subtree shown in FIG. 21, which has the node $1311G_{1,2}$ as the root node. Then, the policy setting section 142 registers the instance name "Web Tier#1" of the node $1311G_{1,2}$ to the field 1352 of the added record 1350 (T305a in FIG. 21).

Then, the policy setting section 142 sets the root node as a node of interest (S306), and adds a "shared List" entry used to register a policy instance which has this node of interest as a target of an operation (S307).

Then, the policy setting section 142 checks the property of the node of interest, and determines whether the property has a description "SHARED", which indicates that this node is shared by instances of multiple application systems (S308). If there is a description "SHARED" (YES in the step S308), the policy setting section 142 registers the instance name of the read policy instance to the "shared List" entry (S309). For example, if the node of interest is the node $1311G_{1,2}$ in FIG. 21, since the property of this node has a description "SHARED", the instance name "job1.p#1" of the policy instance is registered to the "shared List" entry (T309a in FIG. 21).

Then, the policy setting section 142 checks whether policy instances for different application systems are registered to the "shared List" entry of the node of interest (S310). According to this embodiment, as described above, the identification information of a policy instance is represented in a form of a concatenation of a combination of identification information of an instance of a application system to which this policy instance is applied and a definition name of policy definition information from which the policy instance information is instantiated, a connector "#", and a serial number for identifying the policy instance among the same combinations. Thus, it is possible to identify which application system this policy instance is intended for according to the identification information of this policy instance.

Figure 21:
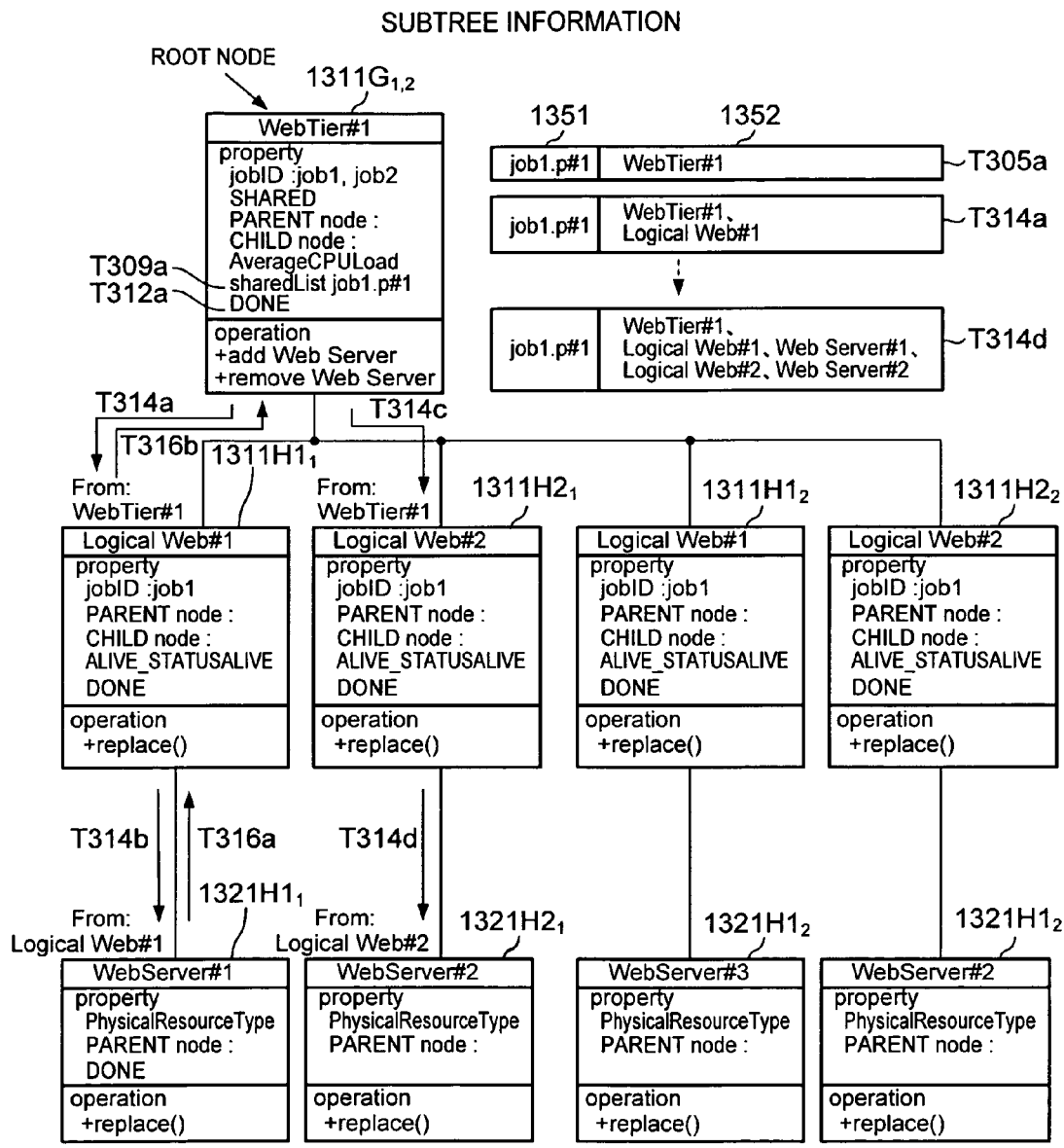
FIG. 21 is a diagram explaining the action target instance creation process shown in FIG. 13.

If policy instances for different application systems are registered to the "shared List" entry of the node of interest (YES in the step S310), the policy setting section 142 warns the operator via the input/output section 12 (S311), and then the process proceeds to a step S312. On the other hand, if policy instances for different application systems are not registered to the "shared List" entry of the node of interest (NO in the step S310), the process immediately proceeds to the step S312. In FIG. 21, the node $1311G_{1,2}$ is shared by the instances of two application systems "job1" and "job2". Thus, a policy instance intended for "job1" and a policy instance intended for "job2" are registered to the "shared List" entry of the node $1311G_{1,2}$, and a warning is thus released.

The policy setting section 142 sets the node of interest to a processed state in the step S312. For example, as shown in FIG. 21, "DONE" is added to the property of the node of interest (T312a in FIG. 21). Then, the policy setting section 142 checks if there are nodes which are not processed ("DONE" is not described in the property) among the child nodes of the node of interest belonging to the target system of the policy instance (S313).

If there are unprocessed nodes among the child nodes of the node of interest belonging to the target system of the policy instance in the step S313 (YES in the step S313), the policy setting section 142 selects one of the unprocessed child nodes, and sets this selected node to a new node of interest. Moreover, the policy setting section 142 sets a "From" entry which is used to specify a return destination, registers the instance name of the previous node of interest to this "Form" entry, and the process returns to the step S307 (S314). For example, if the node of interest is changed from the node $1311G_{1,2}$ to the node $1311H1_1$ in FIG. 21 (T314a in FIG. 21), the instance name "Web Tier#1" of the node $1311G_{1,2}$ is registered to the "From" entry of the node $1311H1_1$. If the node of interest is changed from the node $1311H1_1$ to the node $1321H1_1$ (T314b in FIG. 21), the instance name "Logical Web#1" of the node $1311H_1$ is registered to the "From" entry of the node $1321H1_1$.

On the other hand, if there are no unprocessed nodes among the child nodes of the node of interest belonging to the target system of the policy instance in the step S313, in other words, all the child nodes have already processed (NO in the step S313), the policy setting section 142 checks if the node of interest is the root node or not (S315). If the node of interest is not the root node (NO in the step S315), the policy setting section 142 changes a node to the node of interest which is specified as the return destination in the "From" entry of the node of interest. Then, the process returns to the step S313 (S316). For example, in FIG. 21, if the node of interest is the node $1321H1_1$, the node $1311H1_1$ which is specified as the return destination in the "From" entry of this node of interest is set to a new node of interest (T316a in FIG. 21), and further, the node $1311G_{1,2}$ which is specified to the return destination in the "From" entry of this new node of interest is set to a further new node of interest (T316b in FIG. 21). Then, if the node $1311H2_1$, which is a child node of the node $1311G_{1,2}$, and belongs to the target system "job1" of the policy instance, is not processed, this node $1311H2_1$ is set to a new node of interest in the processing in the step S314, and the instance name "Web Tier#1" of the node $1311G_{1,2}$ is registered to the "From" entry of the node $1311H2_1$.

If the node of interest is a root node in the step S315 (YES in the step S315), the subtree which has this node of interest as a root node has been processed. Then, the policy setting section 142 clears the processed state of the nodes of this subtree, and the setting of the root node (S317). Then, the policy setting section 142 checks whether there are target instances which have not been selected in the action entry of the policy instance read in the step S302 (S318). If there are target instances which have not been selected (YES in the step S318), the process returns to the step S304, and otherwise (NO in the step S318), the process proceeds to a step S319. In the step S319, the policy setting section 142 determines whether the above processing has been executed for all the pieces of policy instance information stored in the policy storage unit 134. If the processing has not been executed for all the pieces of policy instance information (NO in the step S319), the process returns to the step S302, and otherwise (YES in the step S319), the policy setting section 142 completes the process described in the flowchart.

With the above process, an action target instance list is stored in the action target instance storage unit 135 for the respective pieces of policy instance information (T314a to T314d in FIG. 21).

Figure 22:
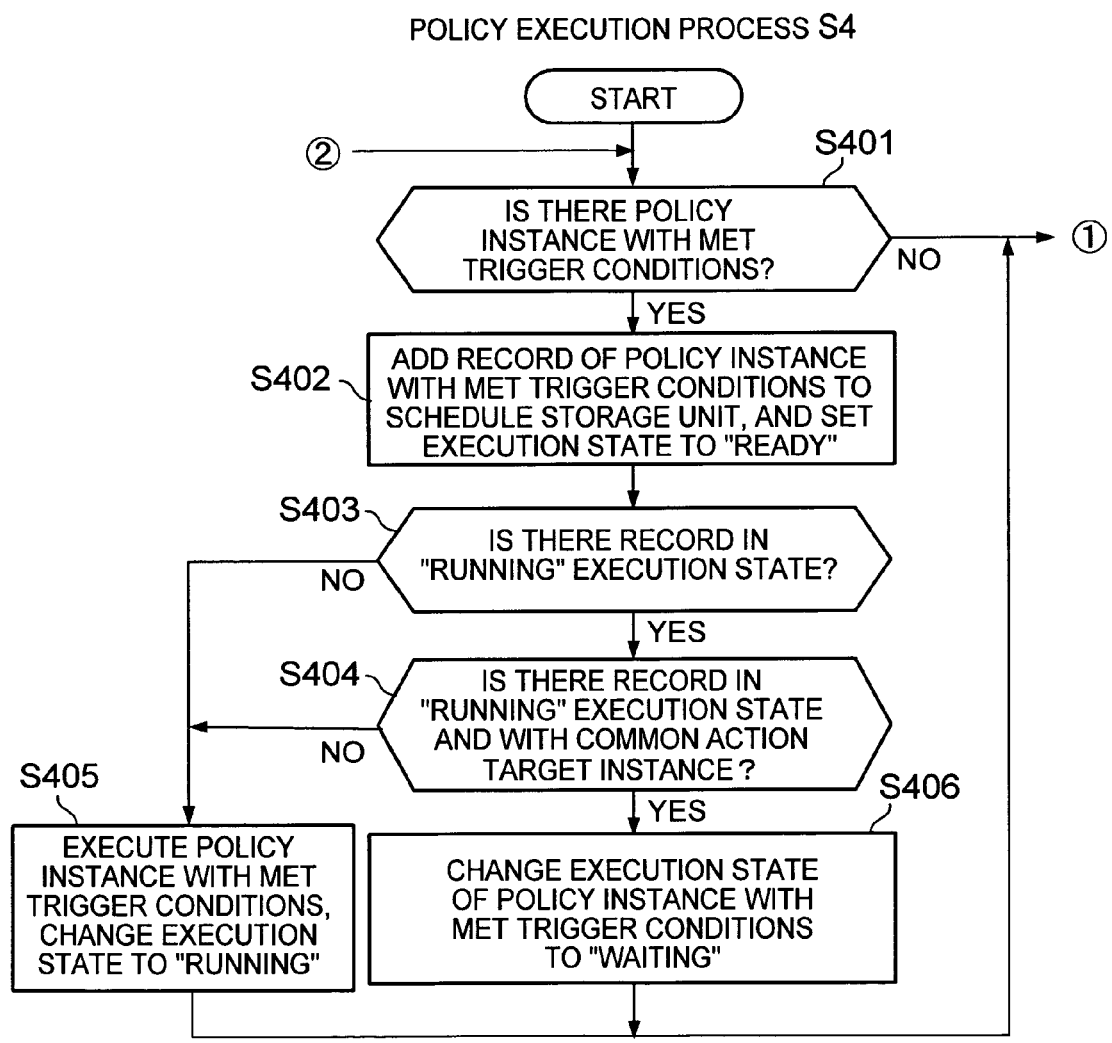
FIG. 22 is a flowchart explaining a policy execution process shown in FIG. 13.
Figure 23:
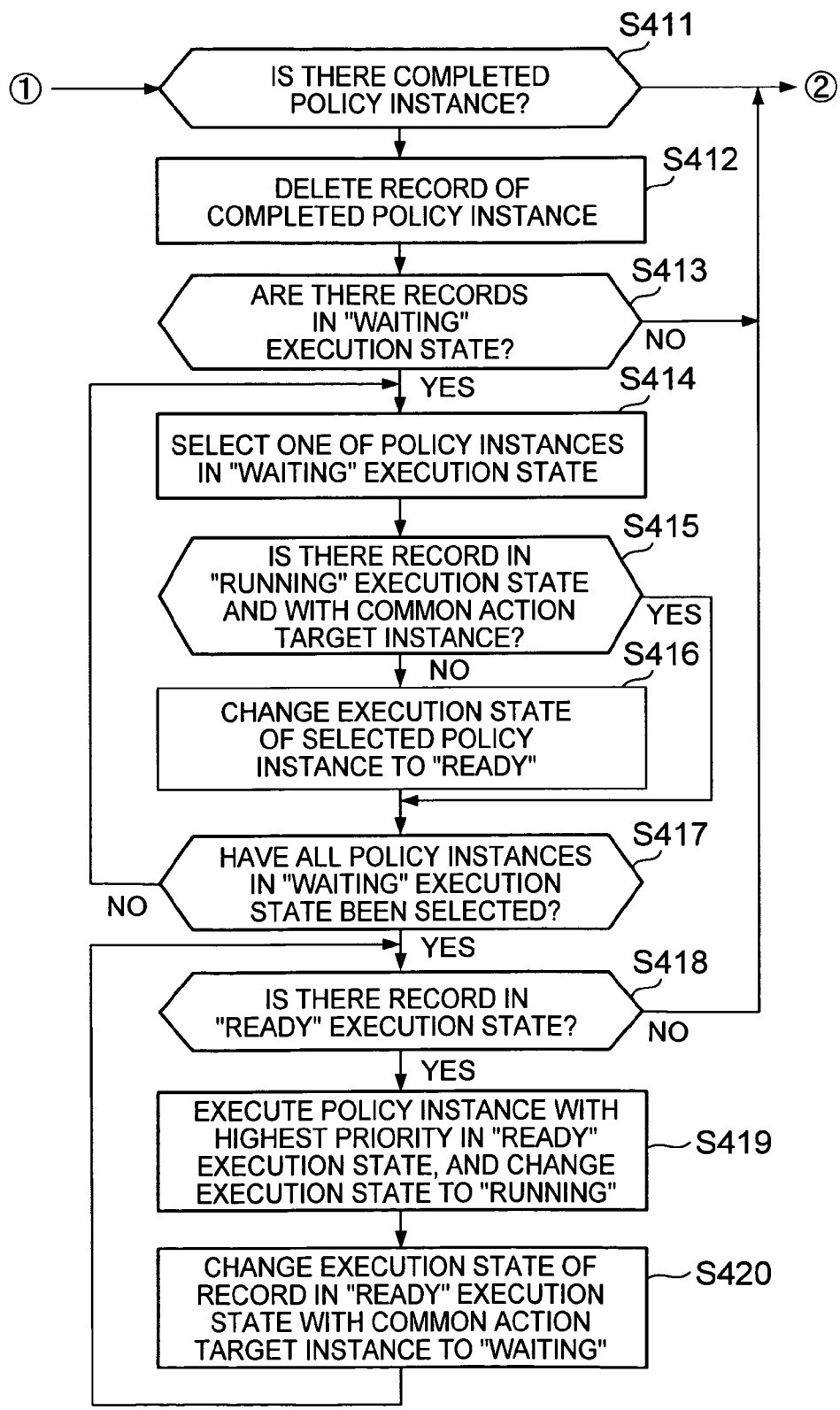
FIG. 23 is a flowchart explaining the policy execution process shown in FIG. 13.

FIGS. 22 and 23 are flowcharts describing the policy execution process (S4) shown in FIG. 13.

If the event collection section 145 receives an event from the information system (load balancers 2 and computer resources 3), the policy scheduler section 144 checks whether the event meets trigger conditions of any of the policy instance information stored in the policy storage unit 134 (S401). If there is policy instance information whose trigger conditions are met (YES in the step S401), the policy scheduler section 144 adds a record 1360 of the policy instance information whose trigger conditions are met to the policy schedule storage unit 136, and registers the instance name, present date and time, and the priority of the policy instance information to the fields 1361, 1362, and 1363. Moreover, the policy scheduler section 144 sets the execution state of the field 1364 to "READY" (S402).

Then, the policy scheduler section 144 refers to the policy schedule storage unit 136, and checks whether a record 1360 whose execution state in the field 1364 is "RUNNING" is registered in the policy schedule storage unit 136 (S403). If a record 1360 whose execution state is "RUNNING" is not registered in the policy schedule storage unit 136 (NO in the step S403), the process proceeds to a step S405. On the other hand, if a record 1360 whose execution state is "RUNNING" is registered in the policy schedule storage unit 136 (YES in the step S403), the policy scheduler section 144 refers to the action target instance storage unit 135, compares an action target instance list of the policy instance information whose trigger conditions are met and an action target instance list of the policy instance information identified by the record 1360 whose execution state is "RUNNING" with each other, and determines whether an instance name of a node common to both of the action target instance lists is registered or not (S404). If such an instance name is not registered (NO in the step S404), the policy scheduler section 144 determines that parallel processing is possible, and the process proceeds to a step S405. On the other hand, if such an instance name is registered (YES in the step S404), the policy scheduler section 144 determines that mutual exclusion is necessary, and the process proceeds to a step S406.

In the step S405, the policy scheduler section 144 changes the execution state of the record 1360 of the policy instance information whose trigger conditions are met from "READY" to "RUNNING", and instructs the policy execution section 143 to execute the policy instance information whose trigger conditions are met. Accordingly, the policy execution section 143 executes operations described in the action entry of the policy instance information notified by the policy scheduler section 144.

For example, if the operation is "add Server", the policy execution section 143 adds a node representing an instance of a server of a type specified by the operation to the system configuration tree information stored in the system configuration storage unit 132. If the operation is "delete Server", the policy execution section 143 deletes a node representing an instance of a server of a type specified by the operation and child nodes thereof from the system configuration tree information stored in the system configuration storage unit 132. If the operation is "replace", the policy execution section 143 changes a physical resource allocated to a node specified by the operation in the system configuration tree information stored in the system configuration storage unit 132. If the operation is "tune parameter", the policy execution section 143 changes parameter setting of a node specified by the operation in the system configuration tree information stored in the system configuration storage unit 132.

In the step S406, the policy scheduler section 144 changes the execution state of the record 1360 of the policy instance information whose trigger conditions are met from "READY" to "WAITING".

When the policy execution section 143 completes execution of certain policy instance information, and the policy scheduler section 144 receives a notice of the completion from the policy execution section 143 (YES in a step S411), the policy scheduler section 144 deletes a record 1360 of the policy instance information whose execution has been completed from the policy schedule storage unit 136 (S412).

Then, the policy scheduler section 144 refers to the policy schedule storage unit 136, and checks whether records 1360 whose execution state of the field 1364 is "WAITING" are registered in the policy schedule storage unit 136 (S413). If such records 1360 are registered (YES in the step S413), the policy scheduler section 144 selects one of the records 1360 whose execution state is "WAITING" stored in the policy schedule storage unit 136 (S414). Then, the policy scheduler section 144 checks whether a record 1360 whose execution state of the field 1364 is "RUNNING" is registered in the policy schedule storage unit 136. If such a record is registered, the policy scheduler section 144 refers to the action target instance storage unit 135, compares an action target instance list of policy instance information identified by the selected record 1360 and an action target instance list of policy instance information identified by the record 1360 whose execution state is "RUNNING" with each other, and determines whether an instance name of a node common to both of the action target instance lists is registered or not (S415). If such an instance name is not registered (NO in the step S415), the policy scheduler section 144 changes the execution state of the selected record 1360 from "WAITING" to "READY" (S416), and the process proceeds to a step S417. On the other hand, if such an instance name is registered (YES in the step S415), the process immediately proceeds to the step S417.

In the step S417, the policy scheduler section 144 determines whether all the records 1360 whose execution state is "WAITING", stored in the policy schedule storage unit 136 have been selected. If all the records 1360 have not been selected (NO in the step S417), the process returns to the step S414. On the other hand, if all the records 1360 have been selected (YES in the step S417), the process proceeds to a step S418.

In the step S418, the policy scheduler section 144 refers to the policy schedule storage unit 136, and checks whether records 1360 whose execution state of the field 1364 is "READY" are registered. If such records are registered (YES in the step S418), the policy scheduler section 144 selects a record 1360 with the highest priority from among the records, changes the execution state of the record 1360 from "READY" to "RUNNING", and instructs the policy execution section 143 to execute policy instance information identified by this record 1360 (S419). Accordingly, the policy execution section 143 executes operations described in the action entry of the policy instance information notified by the policy scheduler section 144.

Moreover, the policy scheduler section 144 checks whether a record 1360 whose execution state of the field 1364 is "READY" is registered in the policy schedule storage unit 136. If such a record is registered, the policy scheduler section 144 refers to the action target instance storage unit 135, compares an action target instance list of policy instance information identified by the record 1360 selected in the step S419 and an action target instance list of policy instance information identified by the record 1360 whose execution state is "READY" with each other, and determines whether an instance name of a node common to both of the action target instance lists is registered or not. If such an instance name is registered, the policy scheduler section 144 changes the execution state of the record 1360 whose execution state is "READY" from "READY" to "WAITING", and the process returns to the step S418 (S420).

Figure 24:
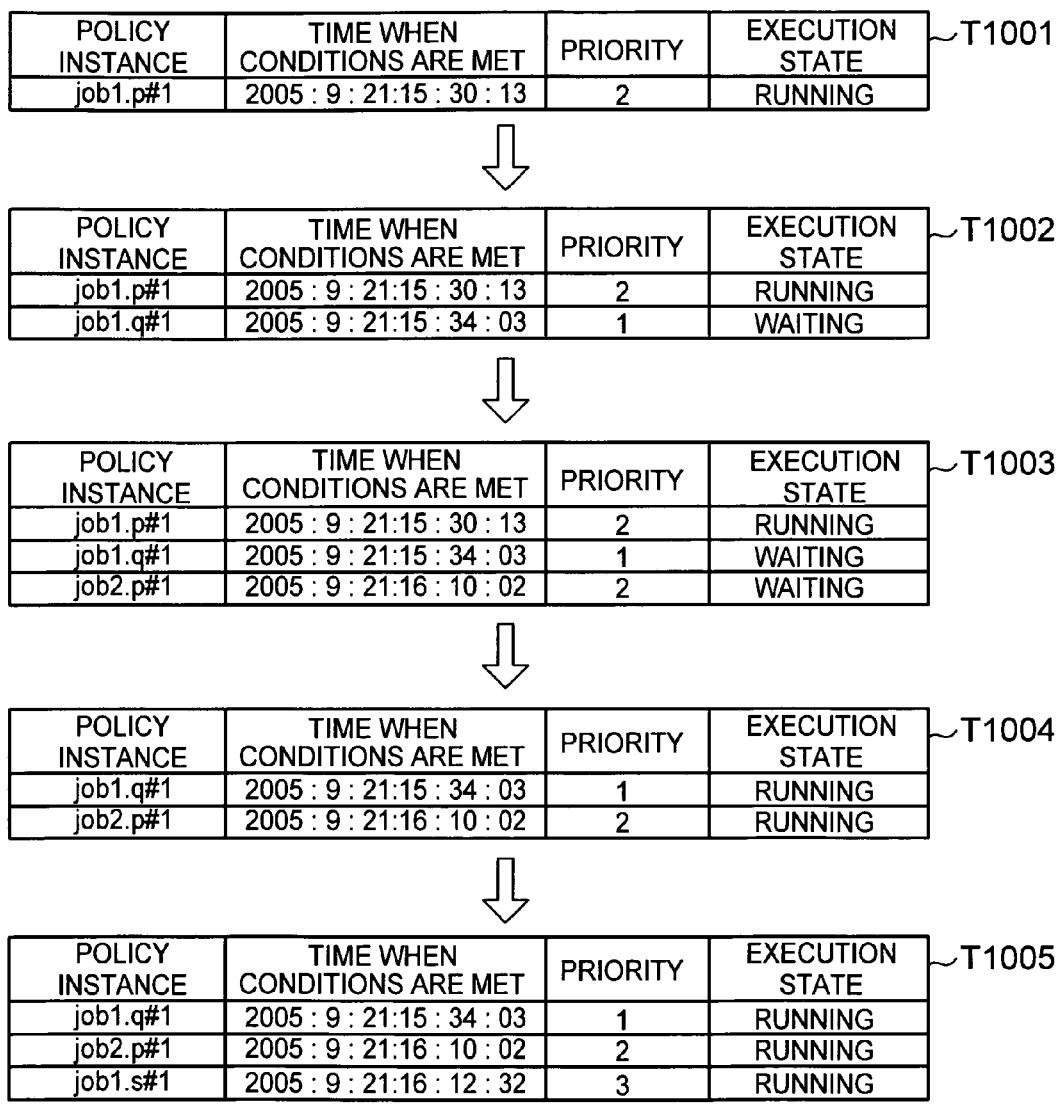
FIG. 24 is a schematic diagram showing an example of a transition of records stored in the policy schedule storage unit.

FIG. 24 is a schematic diagram of an example of a transition of records 1360 stored in the policy schedule storage unit 136.

First, it is assumed that trigger conditions of a policy instance "job1.p#1" are met. A record 1360 of the policy instance "job1.p#1" is registered to the policy schedule storage unit 136. Since only the record 1360 is registered in the policy schedule storage unit 136, the policy instance "job1.p#1" is executed immediately, and the execution state thereof becomes "RUNNING" (T1001).

It is assumed that trigger conditions of a policy instance "job1.q#1" are met during the execution of the policy instance "job1.p#1". A record 1360 of the policy instance "job1.q#1" is registered to the policy schedule storage unit 136. Since the record 1360 of the policy instance "job1.p#1" whose execution state is "RUNNING" is registered in the policy schedule storage unit 136, an action target instance list of the policy instance "job1.p#1" and an action target instance list of the policy instance "job1.q#1" are compared with each other. If the action target instance lists of the respective policy instances are as shown in FIG. 11, these action target instance lists have common instances of nodes ("Logical Web#1" and "Web Server#1"). In this case, the execution state of the record 1360 of the policy instance "job1.q#1" becomes "WAITING" (T1002).

It is assumed that trigger conditions of a policy instance "job2.p#1" are met during the execution of the policy instance "job1.p#1". A record 1360 of the policy instance "job2.p#1" is registered to the policy schedule storage unit 136. Since the record 1360 of the policy instance "job1.p#1" whose execution state is "RUNNING" is registered in the policy schedule storage unit 136, an action target instance list of the policy instance "job1.p#1" and an action target instance list of the policy instance "job2.p#1" are compared with each other. If the action target instance lists of the respective policy instances are as shown in FIG. 11, these action target instance lists have common instances of nodes ("Web Tier#1", "Logical LB#1", and "LB#1"). In this case, the execution state of the record 1360 of the policy instance "job2.p#1" becomes "WAITING" (T1003).

It is assumed that the execution of the policy instance "job1.p#1" is completed, and the record 1360 of the policy instance "job1.p#1" is deleted from the policy schedule storage unit 136. Both the execution states of the record 1360 of the policy instance "job1.q#1" and the record 1360 of the policy instance "job2.p#1" are changed from "WAITING" to "READY". If action target instance lists of the respective policy instances are as shown in FIG. 11, these action target instance lists do not have a common instance of a node. Accordingly, both the execution states of the record 1360 of the policy instance "job1.q#1" and the record 1360 of the policy instance "job2.p#1" are changed from "READY" to "RUNNING" (T1004).

It is assumed that trigger conditions of a policy instance "job1.s#1" are met during the execution of the policy instance "job1.q#1" and the policy instance "job2.p#1". A record 1360 of the policy instance "job1.s#1" is registered to the policy schedule storage unit 136. Since the record 1360 of the policy instance "job1.q#1" and the record 1360 of the policy instance "job2.p#1" whose execution states are "RUNNING" are registered to the policy schedule storage unit 136, the respective action target instance lists of the policy instance "job1.q#1" and the policy instance "job2.p#1" and an action target instance list of the policy instance "job1.s#1" are compared with each other. On this occasion, if the action target instance lists of the respective policy instances are as shown in FIG. 11, these action target instance lists do not have a common instance of a node. Therefore, the execution state of the record 1360 of the policy instance "job1.s#1" is set to "RUNNING" (T1005).

Figure 25:
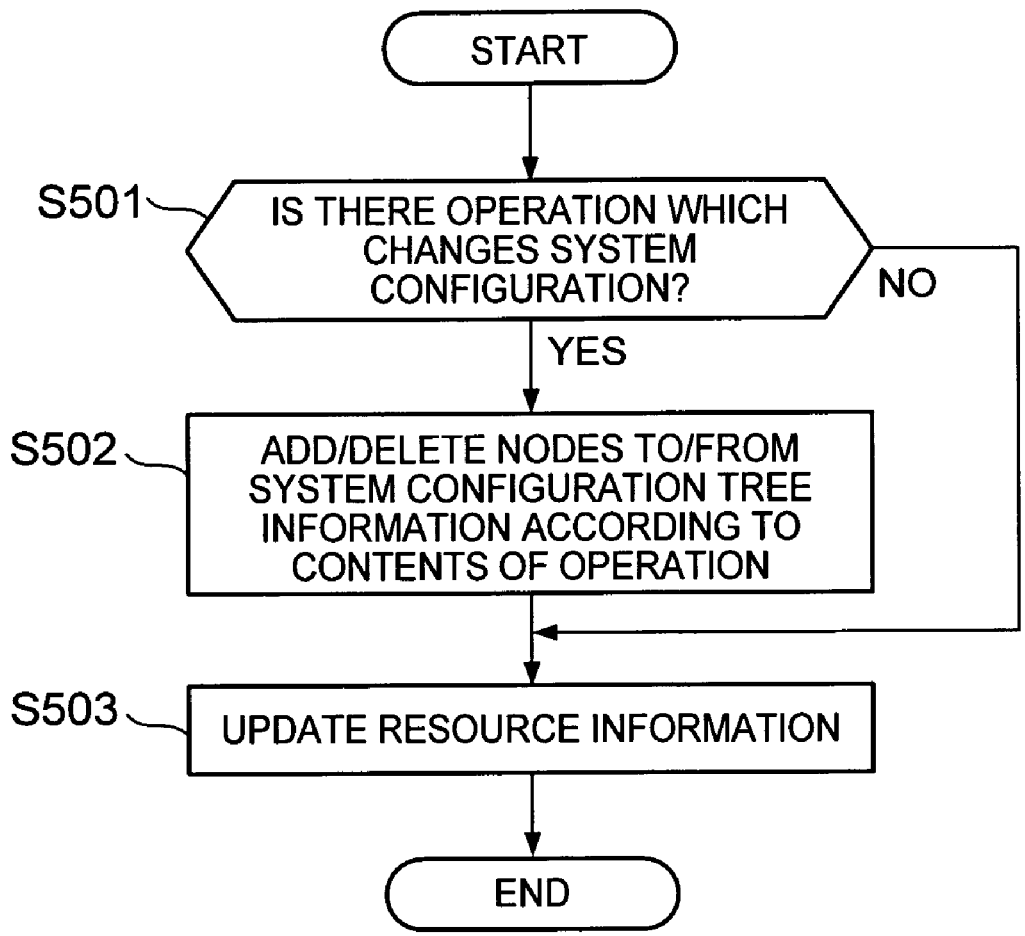
FIG. 25 is a flowchart explaining a system configuration tree information change process shown in FIG. 13.

FIG. 25 is a flowchart describing the system configuration tree information changing process (S5) shown in FIG. 13.

If the configuration management section 141 receives an operation from the policy execution section 143 (YES in a step S501), the configuration management section 141 adds a node to, deletes a node from, and changes a node in the system configuration tree information stored in the system configuration storage unit 132 according to the operation (S502).

For example, as shown in FIGS. 7 and 8, if a target instance of an operation is "Web Tier#1" (node $1311G1_{1,2}$), and a content of the operation is "add Server", the configuration management section 141 adds a new instance "Web Server#5" as a child node of the node $1311G1_{1,2}$, and allocates a physical resource as a child node of the instance "Web Server#5". On the other hand, if a content of the operation is "delete Server", the configuration management section 141 deletes a node of an instance "Web Server#*" specified by this operation from the child nodes of the node $1311G1_{1,2}$, and a child node of a physical resource allocated to this node. Moreover, when the target instance of the operation is "Logical Web#1" (node $1311H1_1$), and a content of the operation is "replace", the configuration management section 141 allocates another physical resource as a child node $1312H1_1$ of the node $1311H1_1$. The method for allocating the physical resource is similar to the system configuration tree information producing process S1 shown in FIG. 14.

Then, the configuration management section 141 detects whether the state of physical resources allocated to the instances of the application system is changed by the processing in the step S502, and reflects a result of the detection to the resource configuration storage unit 133 (S503). To be specific, the configuration management section 141 clears the registered contents of the field 1333 of the respective records 1330 registered to the resource configuration storage unit 133. Then, for the respective records 1330, the configuration management section 141 identifies a parent node of a node of a physical resource having a resource ID registered in the field 1331 of the record 1330, and registers a class from which an instance of this parent node is instantiated, and an instance of a application system to which this parent node belongs in the field 1333 of the record 1330.

In the above section, the first embodiment of the present invention has been described.

According to this embodiment, if trigger conditions of a certain policy instance are met, and a target instance of this policy instance conflicts with a target instance of another policy instance under execution, the execution of this policy instance is suspended (mutual exclusion control), and if there arises no conflict, this policy instance is executed immediately (parallel processing control). As a result, the concurrency control of the policy instances is provided to efficiently utilize the resources of the entire information system.

Moreover, according to this embodiment, when the execution of multiple policy instances are suspended, a policy instance with the highest priority can be executed first. As a result, the resources of the entire information system can be utilized much more efficiently.

Second Embodiment

This embodiment enables the first embodiment described above to handle policy definition information which has a trigger condition in a tier structure.

Figure 26:
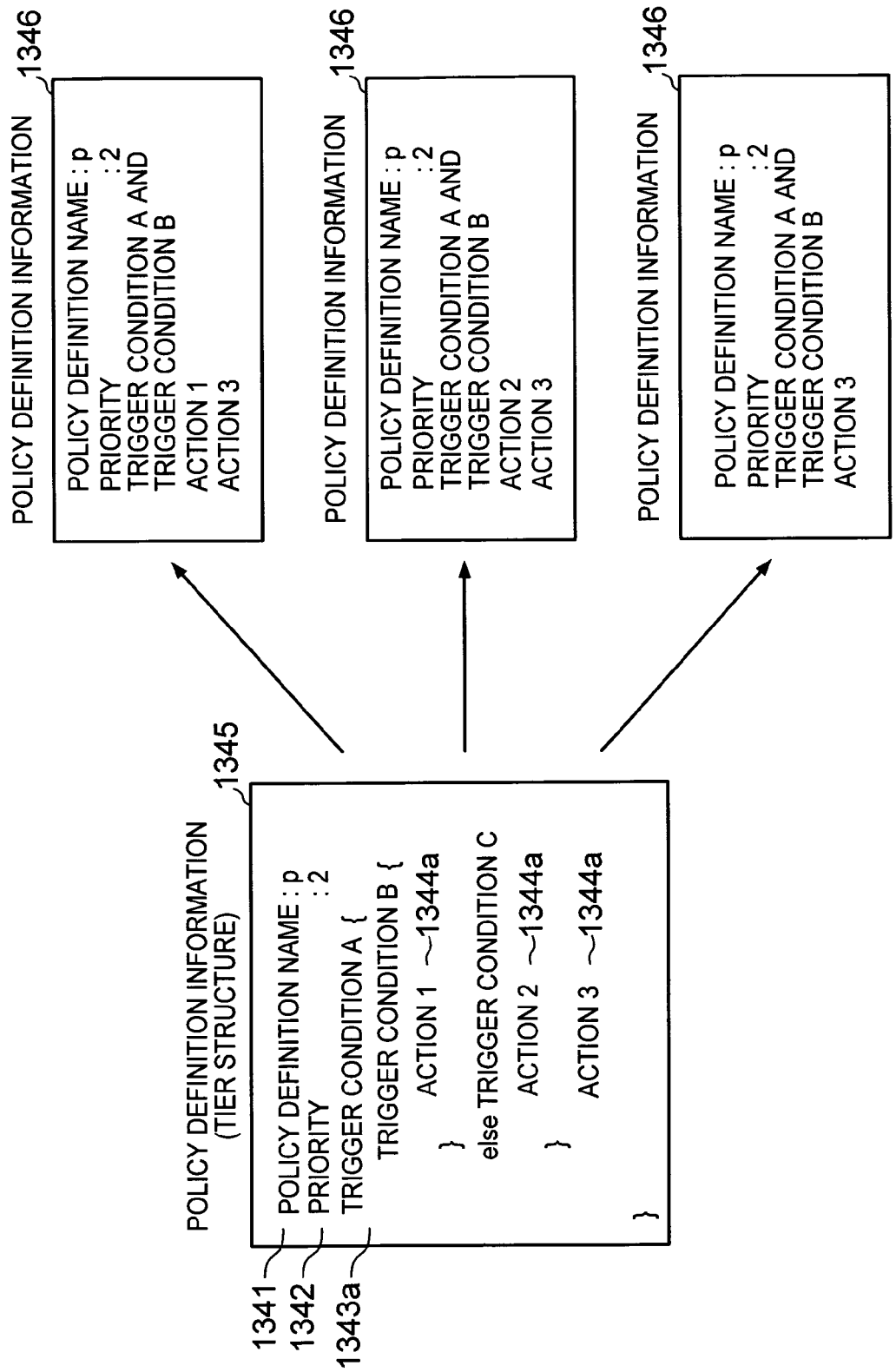
FIG. 26 is a schematic diagram showing policy definition information including trigger conditions in a tier structure.

FIG. 26 is a schematic diagram of the policy definition information including a trigger condition in the tier structure. Policy definition information 1345 according to this embodiment is different from the policy definition information 1340 according to the first embodiment as shown in FIG. 10 in that multiple trigger conditions are unified into one by representing trigger conditions 1343a in a tier structure, and an action 1344a is assigned to the respective multiple trigger conditions. A logical expression of a trigger condition in a tier structure can be expanded into a sum of logical ANDs. Thus, the policy setting section 142 according to this embodiment expands a logical expression represented by a trigger condition 1343a of policy definition information 1345 stored in the policy storage unit 134 into a sum of logical ANDs as shown in FIG. 26. The policy setting section 142 creates policy definition information 1346 including a description of an action 1344a assigned to a trigger condition represented by a logical AND for the respective logical ANDs, and displays the policy definition information 1346 on the input/output section 12. In this way, this embodiment can receive policy instance information having trigger conditions which are not configured in a tier structure from the operator, and can store the policy instance information in the policy storage unit 134 as the first embodiment.

Third Embodiment

According to the first embodiment described above, prior to the policy execution process S4, the action target instance creation process S3 is executed. According to this embodiment, prior to the policy execution process S4, the action target instance creation process S3 is not executed. The concurrency control is carried out by determining, when trigger conditions of a policy instance are met, execution of another policy instance having a target system common to the policy instance with the met trigger conditions in the policy execution process S4. The other processes are the same as those of the first embodiment. It should be noted that the action target instance storage unit 135 may be omitted.

Figure 27:
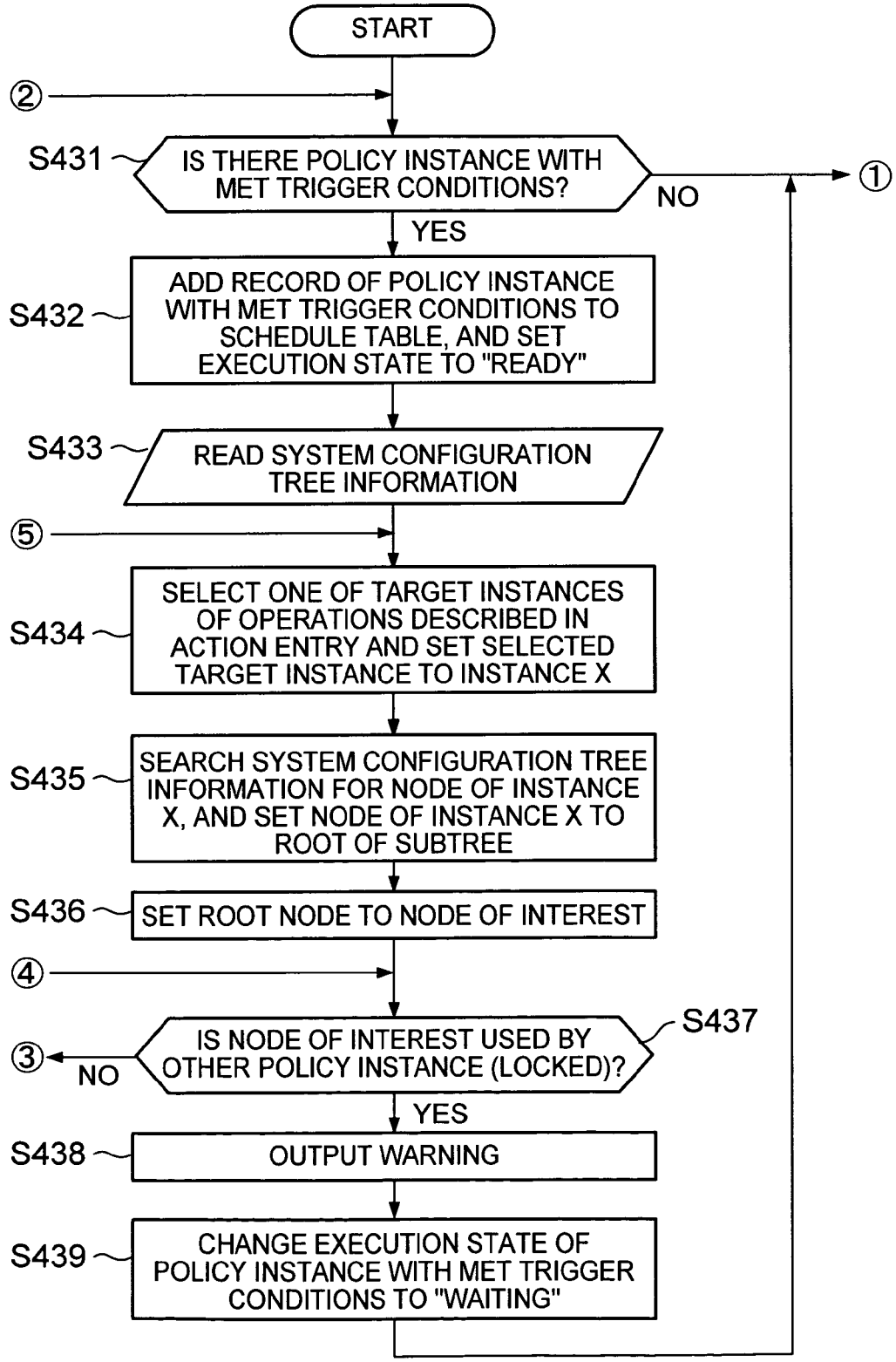
FIG. 27 is a flowchart explaining the policy execution process according to a third embodiment.
Figure 28:
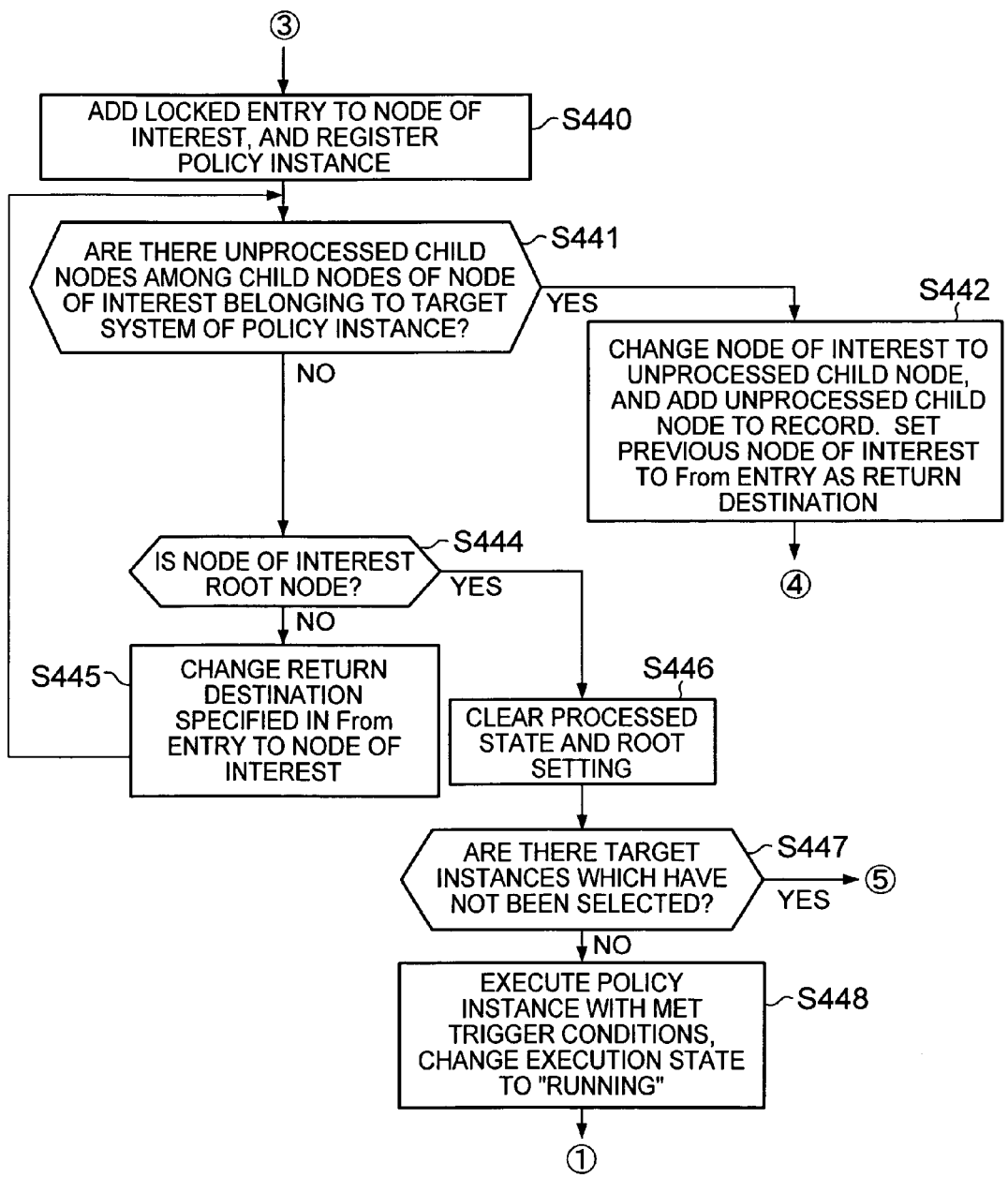
FIG. 28 is a flowchart explaining a policy execution process according to the third embodiment.
Figure 29:
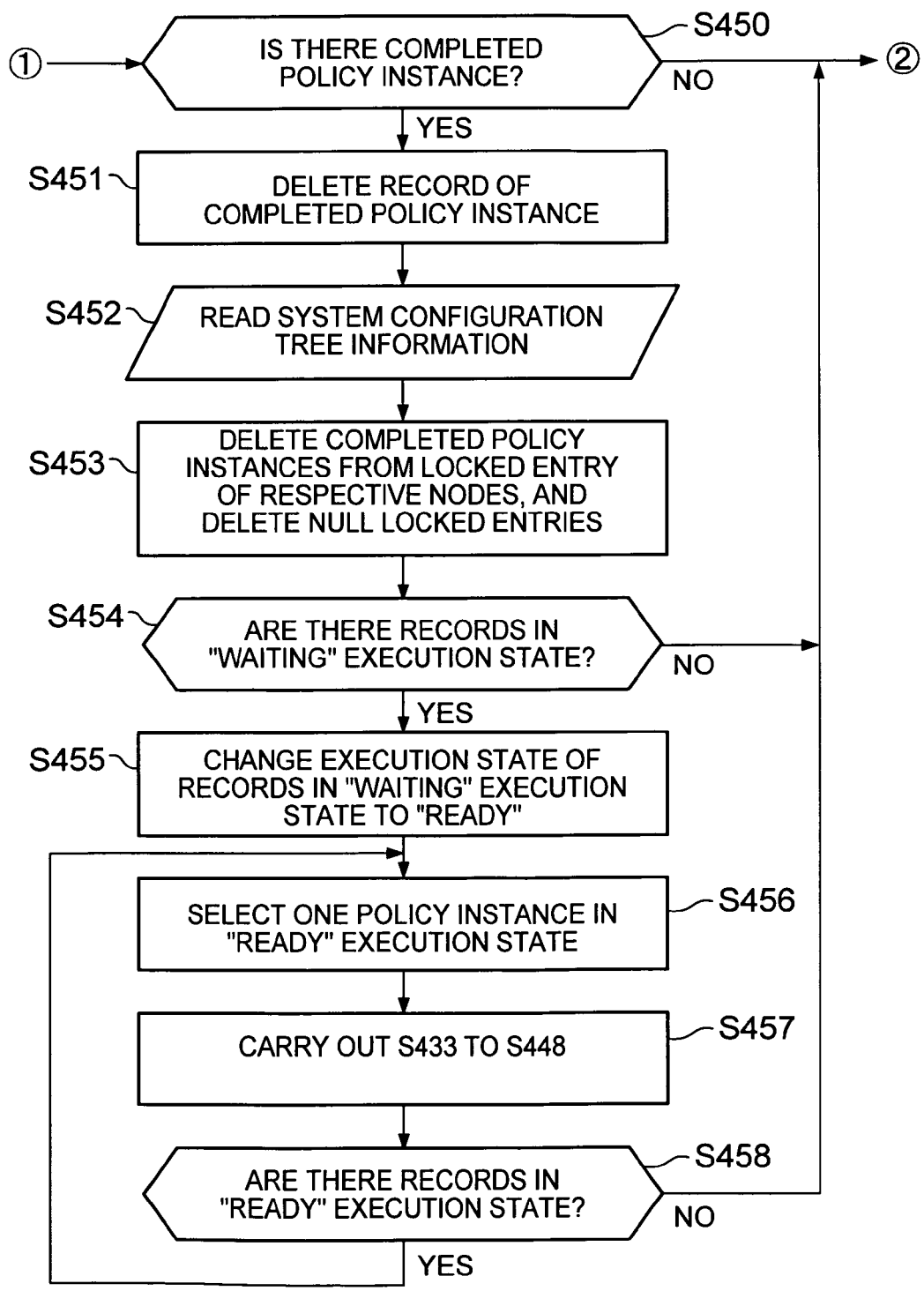
FIG. 29 is a flowchart explaining the policy execution process according to the third embodiment.

FIGS. 27 to 29 are flowcharts describing the policy execution process S4 according to the third embodiment of the present invention.

If the event collection section 145 receives an event from the information system (load balancers 2 and computer resources 3), the policy scheduler section 144 checks whether this event causes trigger conditions of any of the policy instance information stored in the policy storage unit 134 to be met (S431). If there is policy instance information whose trigger conditions are met (YES in the step S431), the policy scheduler section 144 adds a record 1360 of the policy instance information whose trigger conditions are met to the policy schedule storage unit 136, and registers an instance name, and present date and time of the policy instance information to the fields 1361 and 1362. Moreover, the policy scheduler section 144 sets the execution state of the field 1364 to "READY" (S432).

Then, the policy scheduler section 144 reads the system configuration tree information from the system configuration storage unit 132 (S433). The policy scheduler section 144 selects one of target instances of operations described in the action entry of the policy instance information whose trigger conditions are met, and designates this instance to an instance X (S434).

Then, the policy scheduler section 144 searches the read system configuration tree information for a node of the instance X, and sets this node as a root node of a subtree (S435). Then, the policy scheduler section 144 sets the root node to a node of interest, and adds a description "DONE" indicating a processed state to the property of this node (S436).

Then, the policy scheduler section 144 checks whether a "LOCKED" entry indicating that other policy instance conducting an operating on the node is described in the property of the node of interest (S437). If the "LOCKED" entry is not described in the property of the node of interest (NO in the step S437), the process proceeds to a step S440. On the other hand, if the "LOCKED" entry is described in the property of the node of interest (YES in the step S437), the policy scheduler section 144 warns the operator via the input/output section 12 (S438), and changes, to "WAITING", the execution state registered in the field 1364 of the record 1360 of the policy instance information, whose trigger conditions are met, stored in the policy schedule storage unit 136 (S439).

In the step S440, the policy scheduler section 144 adds the "LOCKED" entry to the property of the node of interest, and describes an instance name of the instance information whose trigger conditions are met in this "LOCKED" entry. Then, the policy scheduler section 144 checks if there are nodes which are not processed (the "DONE" entry is not described in the property) among the child nodes of the node of interest belonging to the target system of the policy instance whose trigger conditions are met (S441).

If there are unprocessed nodes among the child nodes of the node of interest belonging to the target system of the policy instance whose trigger conditions are met in the step S441 (YES in the step S441), the policy scheduler section 144 selects one of the unprocessed child nodes, and sets this selected node to a new node of interest. Moreover, the policy scheduler section 144 adds the "DONE" entry indicating a processed state to a property of the new node of interest, sets the "From" entry which is used to specify a return destination, registers the instance name of the previous node of interest to this "Form" entry, and the process returns to the step S437 (S442).

On the other hand, in the step S441, if there are no unprocessed nodes among the child nodes of the node of interest belonging to the target system of the policy instance whose trigger conditions are met, in other words, all the nodes have been processed (NO in the step S441), the policy scheduler section 144 checks if the node of interest is a root node or not (S444). If the node of interest is not a root node (NO in the step S444), the policy scheduler section 144 changes, to the node of interest, a node which is specified as the return destination in the "From" entry of the node of interest. Then, the process returns to the step S441 (S445).

If the node of interest is a root node in the step S444 (YES in the step S444), the subtree which has the node of interest as a root node has been processed. Then, the policy scheduler section 144 clears setting of the processed state of the nodes of the subtree, and the setting of the root node (S446).

Then, the policy scheduler section 144 checks if there are target instances which have not been selected in the action entry of the policy instance whose trigger conditions are met (S447). If there are target instances which have not been selected (YES in the step S447), the process returns to the step S434. If there are not target instances which have not been selected (NO in the step S447), the policy scheduler section 144 changes the execution state registered to the field 1364 of the record 1360 of the policy instance information whose trigger conditions are met to "RUNNING", and instructs the policy execution section 143 to execute the policy instance information whose trigger conditions are met (S448). Accordingly, the policy execution section 143 executes operations described in the action entry of the policy instance information notified by the policy scheduler section 144.

When the policy execution section 143 completes execution of certain policy instance information, and the policy scheduler section 144 receives a notice thereof from the policy execution section 143 (YES in a step S450), the policy scheduler section 144 deletes the record 1360 of the policy instance information whose execution has been completed from the policy schedule storage unit 136 (S451).

Then, the policy scheduler section 144 reads the system configuration tree information from the system configuration storage unit 132 (S452). Then, the policy scheduler section 144 deletes the instance name of the policy instance information whose execution has been completed from the "LOCKED" entry of the respective nodes with the "LOCKED" entry in the system configuration tree information. Moreover, the policy scheduler section 144 deletes "LOCKED" entries which have become null as a result (S453).

Then, the policy scheduler section 144 determines whether records 1360 whose execution state is "WAITING", are stored in the policy schedule storage unit 136 (S454). If such a record 1360 is not stored (NO in the step S454), the process returns to the step S401. If such a records are stored (YES in the step S454), the policy scheduler section 144 changes the execution state of the record 1360 stored in the policy schedule storage unit 136 from "WAITING" to "READY" (S455). Then, the policy scheduler section 144 selects one of the records 1360 whose execution state is "READY" in the policy schedule storage unit 136 (S456), and executes the processing in the steps S433 to S448 for a policy instance identified by the record 1360 (S457).

Then, the policy scheduler section 144 determines whether records 1360 whose execution state is "READY" are stored in the policy schedule storage unit 136 (S458). If such records are stored in the policy schedule storage unit 136 (YES in the step S458), the process returns to the step S456. If such a record 1360 is not stored (NO in the step S458), the process returns to the step S401.

Fourth Embodiment

The first embodiment determines whether a policy instance can be executed for respective policy instance information whose trigger conditions are met, in the policy execution process S4. In contrast, this embodiment determines whether an operation can be executed, for respective operations (actions) of policy instance information whose trigger conditions are met.

According to this embodiment, an action target instance list is created for respective operations of policy instance information, and is registered to the action target instance storage unit 135. Thus, according to this embodiment, the action target instance creation process S3 shown in FIGS. 18 and 19 is modified as follows.

First, the processing in the step S303 is moved to a position between the processing in the step S304 and the processing in the step S305. Then, in the step S303, as a policy instance name to be registered in the field 1351 of the record 1350 newly added to the action target instance storage unit 135, a name which shows not only for which policy instance the name is given, but also for which operation the policy instance is intended by the name, is used. For example, for an nth operation described in the action entry of the policy instance "job1.p#1", as a policy instance name registered to the record 1350, a name "job1.p#1_n" obtained by concatenating the policy instance name "job1.p#1" and the operation number "n" with "_" therebetween is used.

Moreover, according to this embodiment, a schedule to be executed is registered to the policy schedule storage unit 136, for each combination of an operation of policy instance information whose trigger conditions are met and a node described in an action target instance list for this operation. FIG. 30 is a schematic diagram of registered contents of the policy schedule storage unit 136. As illustrated, a record 1365 is registered to the policy schedule storage unit 136, for each combination of an operation of policy instance information whose trigger conditions are met and a node described in an action target instance list for this operation. The record 1365 includes a field 1366 used to register an instance name of a node, a field 1367 used to register an instance name of policy instance information, a field 1368 used to register an operation number described in the action entry of the policy instance information, a field 1369 used to register time and date when a trigger conditions of the policy instance information are met, a field 1370 used to register the priority of the policy instance information, and a field 1351 used to register the execution state of the operation.

As described above, according to this embodiment, a schedule to be executed is registered to the policy schedule storage unit 136 for each combination of an operation of policy instance information whose trigger conditions are met and a node described in an action target instance list for this operation. Accordingly, the policy execution process S4 shown in FIGS. 22 and 23 is modified as described below.

First, in the step S402, the policy scheduler section 144 searches the action target instance storage unit 135 for an action target instance list corresponding to a first operation described in the action entry of the policy instance information whose trigger conditions are met, creates a record 1365 for respective instances of nodes described in the searched action target instance list, and stores the generated records 1365 in the policy schedule storage unit 136. Then, the policy scheduler section 144 registers an instance name of the corresponding node, an instance name of the policy instance information, the number of the operation ("1" in this case), time and date when the trigger conditions are met, and the priority, to fields 1366 to 1370 of the respective records 1365. Moreover, the policy scheduler section 144 registers the execution state "READY" to the field 1371.

Moreover, the policy scheduler section 144 carries out the steps S403 to S406 for the respective records 1365 stored in the policy schedule storage unit 136 by the processing in the step S402. On this occasion, in the step S404, the policy scheduler section 144 determines whether there is a record 1365 whose instance name of a node registered to the field 1366 is the same as an instance name of a node registered to the field 1366 of the target record 1365, in the records 1365 whose execution state is "RUNNING". If there is not such a record, the process proceeds to the step S405, executes an operation identified by the target record 1365, and changes the execution state of the target record 1365 to "RUNNING". If there is such a record, the process proceeds to the step S406, and changes the execution state of the target record 1365 to "WAITING".

Moreover, in the step S412, the policy scheduler section 144 deletes the record 1365 of the operation whose execution has been completed, from the schedule storage unit 136, and checks whether an operation following to the operation identified by the number registered to the field 1368 of this record 1365 is described in the action entry of policy instance information having the instance name registered to the field 1367 of this record 1365. If the following operation is described, the policy scheduler section 144 adds a new record 1365 to the policy schedule storage unit 136, and registers the instance name of the node registered to the field 1366 of the deleted record 1360, the instance name of the policy instance information registered to the field 1367 of the deleted record 1360, a number obtained by incrementing the operation number registered to the field 1368 of the deleted record 1360 by one, the date and time when the trigger conditions are met registered to the field 1369 of the deleted record 1360, and the priority registered to the field 1370 of the deleted record 1360, to the fields 1366 to 1370 of this record 1365. Further, the policy scheduler section 144 registers the execution state "READY" to the field 1371.

Also, in the step S415, the policy scheduler section 144 determines whether there is a record 1365 whose instance name of a node registered to the field 1366 of the record 1365 selected in the step S414 is the same as an instance name of a node registered to the field 1366 in the records 1365 whose execution state is "RUNNING". If there is such a record 1365, the policy scheduler section 144 changes the execution state of the selected record 1365 to "READY" (S416), and the process proceeds to the step S417. On the other hand, if there is not such a record, the process immediately proceeds to the step S417.

FIG. 31 is a schematic diagram of an example of a transition of records 1365 stored in the policy schedule storage unit 136.

It is assumed that trigger conditions of the policy instance "job1.p#1" are met, and after that, trigger conditions of the policy instance "job1.p#2" are met. First, a record is registered to the schedule storage unit 136 for respective instances of nodes ("Web Tier#1" and "Logical Web#1") described in an action target instance list assigned to a combination "job1.p#1_1" of the policy instance "job1.p#1" and the operation described first in the action entry thereof. Since only these records 1365 are registered to the policy schedule storage unit 136, the policy instance "job1.p#1" is executed immediately, and the execution state thereof becomes "RUNNING".

Then, a record 1365 is registered to the schedule storage unit 136 for respective instances of nodes ("Web Tier#1" and "Logical Web#3") described in an action target instance list assigned to a combination "job2.p#1_1" of the policy instance "job2.p#1" and the operation described first in the action entry thereof. On this occasion, the record 1365 including the instance "Web Tier#1" of the node is registered to the policy schedule storing unit 136, and the execution state thereof is "RUNNING". Thus, the execution state of the record 1365 of the first operation of the policy instance "job2.p#2" including the instance "Web Tier#1" of the node becomes "WAITING". On the other hand, a record 1365 including an instance "Logical Web#3" of the node is not registered to the policy schedule storage unit 136. Thus, the first operation of the policy instance "job2.p#1" having the instance "Logical Web#3" of the node is immediately executed, and the execution state of the record 1365 becomes "RUNNING" (T1101).

When the execution of the first operation of the policy instance "job1.p#1" is completed, the records 1365 of this operation are deleted from the policy schedule storage unit 136. As a result, only the record 1365 including the instance "Web Tier#1" of the node is the record 1365 of the first operation of the policy instance "job2.p#1". Therefore, this operation is executed, the execution state of the record 1365 becomes "RUNNING" (T1102).

When the records 1365 of the first operation of the policy instance "job1.p#1" are deleted from the policy schedule storage unit 136, records 1365 are newly registered to the policy schedule storage unit 136 for the respective instances ("Logical LB#1" and "LB#1") of nodes described in an action target instance list associated with a combination "job1.p#1_2" of the policy instance "job1.p#1" and the second operation described in the action entry thereof. On this occasion, the record 1365 including an instance "Logical LB#1" of the node is not registered to the policy schedule storage unit 136. Similarly, the record 1365 including an instance "LB#1" of the node is not registered. Thus, the records 1365 of the second operation of the policy instance "job1.p#1" are immediately executed, and the execution state of the records 1365 becomes "RUNNING" (T1103).

When the execution of the first operation of the policy instance "job2.p#1" is completed, the records 1365 of this operation are deleted from the policy schedule storage unit 136 (T1104).

The fourth embodiment of the present invention has been described above. According to this embodiment, the concurrency control can be provided for respective operations (actions) of policy instance information.

The present invention is not limited to the above embodiments, and may be modified in various ways within the gist thereof. For example, though the management network 7 and the application network 6 are independently provided according to the above respective embodiments, one network may be shared by the management network and the application network.

Moreover, in the above embodiments, the date and time when trigger conditions are met and the priority which are registered to a record of a schedule stored in the policy schedule storage unit 136 may be omitted. Moreover, in the case where the execution of the policy instances conflicts, it may be determined as to which policy instance is to be executed, based on other information. For example, hint information (such as short or long) of a time period required to execute an action may be used in place of the priority, and execution of a policy instance with a shorter execution period may be prioritized. Moreover, the number of instances of nodes described in an action target instance list of a policy instance may be used in place of the priority, and this number of instances may be used to schedule the sequence of execution so that the degree of parallelism to execute policy instances may be increased. For the scheduling of the execution sequence, the existing list scheduling and the like used for the task scheduling in the multi-programming may be employed, on constraint condition that the action target instance lists share a common part.

What is claimed is:

1. A control device for controlling an information system that includes a plurality of components, the control device comprising:
   a configuration information storage unit which stores components information, related to the plurality of components, and components relationship information on respective components, each of which is operated by the information system;
   a policy storage unit which stores a plurality of policies, each of which includes an action entry including a description of a component to be operated and of an operation to be executed by the component, and a trigger condition entry including a description of a condition for triggering the component to execute the operation;
   a list storage unit which stores a component list including component information related to a component to be operated described in the action entry of a policy and all the other components having a relationship to the component, according to the component information and component relationship information stored in the configuration information storage unit;
   an event reception section which receives an event occurring in the information system;
   a policy selecting section which selects a policy having the description of the condition corresponding to the event received by the event reception section from the plurality of the policies stored in the policy storage unit; and a policy execution section which executes an operation described in the action entry of the selected policy, wherein:

in response to receiving an event by the event receipt section, the policy selecting section selects a second policy from the plurality of the policies stored in the policy storage unit, the policy execution section determines whether a first policy has already been selected by the policy selecting section and the operation of the action entry in the first policy is being executed;

if the operation of the action entry in the first policy is being executed, the policy execution section identifies a first component list related to the first policy and a second component list related to the second policy from the list storage unit;

the policy execution section compares the first component list with the second component list in the list storage unit in order to determine whether both the first and second component lists include a common component information related to a common component;

if both of the first and second component lists do not include a common component information, the policy execution section executes the operation of the action entry in the second policy during the operation of the action entry in the first policy that is being executed; and if both of the first and second component lists include common component information, the policy execution section suspends the execution of the operation of the action entry in the second policy.

2. A control device according to claim 1, further comprising:

a policy resuming section which resumes the suspended operation of the action entry in the second policy, after the operation described in the action entry of the first policy executed by the control device is completed.

3. A control device according to claim 1, further comprising:

a policy input section which receives an input of a new policy, and stores the policy in the policy storage unit; and a component list creation processing section which identifies a component information related to a component to be operated, described in the action entry to the new policy received by the policy input section, and all the other components connected to the component, using the component relationship information of the respective components, according to the component information and the component relationship information stored in the configuration information storage unit, and stores a component list including all the identified components information in the list storage unit.

4. A control device for controlling an information system including a plurality of components, comprising:

a configuration information storage unit which stores components information, related to the plurality of components and components relationship information on respective components, each of which is operated by the information system;

a policy storage unit which stores a plurality of policies, each of which includes an action entry including a description of a component to be operated and of an operation to be executed by the component, and a trigger condition entry including a description of a condition for triggering the component to execute the operation;

a list storage unit which stores a component list including component information related to a component to be operated described in the action entry of a policy, and all the other components having a relationship to the component, according to the component information and component relationship information stored in the configuration information storage unit;

an operation result reception section which receives a result of an operation performed in the information system;

a policy selecting section which selects a policy having the description of the condition in the trigger condition entry corresponding to the operation result received by the operation result reception section from the plurality of the policies stored in the policy storage unit; and a policy execution section which executes an operation described in the action entry of the selected policy, wherein:

in response to receiving a result of an operation performed in the information system by the operation result reception section, the policy selecting section selects a second policy from the plurality of the policies stored in the policy storage unit, the policy execution section determines whether a first policy has already been selected by the policy selecting section and the operation of the action entry in the first policy is being executed;

if the operation of the action entry in the first policy is being executed, the policy execution section identifies a first component list related to the first policy and a second component list related to the second policy from the list storage unit;

the policy execution section compares the first component list with the second component list in the list storage unit in order to determine whether both the first and second component lists include a common component information related to a common component;

if both of the first and second component lists do not include a common component information, the policy execution section executes the operation of the action entry in the second policy during the operation of the action entry in the first policy that is being executed; and if both of the first and second component lists include common component information, the policy execution section suspends the execution of the operation of the action entry in the second policy.

5. A control method for an information system having a control device that includes a plurality of components, and in which the control device comprises:

a configuration information storage unit which stores components information, related to the plurality of components, and components relationship information on respective components, each of which is operated by the information system;

a policy storage unit which stores a plurality of policies, each of which includes an action entry including a description of a component to be operated and of an operation to be executed by the component, and a trigger condition entry including a description of a condition for triggering the component to execute the operation;

a list storage unit which stores a component list including a component information related to a component to be operated described in the action entry of a policy, and all the other components having a relationship to the component, according to the component information and component relationship information stored in the configuration information storage unit, the control method comprising the steps of:

receiving an event occurring in the information system;

selecting a policy having the description of the condition corresponding to the event received by the event reception section from the plurality of the policies stored in the policy storage unit; and executing an operation described in the action entry of the selected policy, wherein, the step of executing further comprises the steps of:

in response to receiving an event by the event receipt section, the policy selecting section selects a second policy from the plurality of the policies stored in the policy storage unit, determining whether a first policy has already been selected by the policy selecting section and the operation of the action entry in the first policy is being executed;

if the operation of the action entry in the first policy is being executed, then identifying a first component list related to the first policy and a second component list related to the second policy from the list storage unit;

comparing the first component list with the second component list in the list storage unit in order to determine whether both the first and second component lists include a common component information related to a common component;

if both of the first and second component lists do not include a common component information, then executing the operation of the action entry in the second policy during the operation of the action entry in the first policy that is being executed; and if both of the first and second component lists include common component information, then suspending the execution of the operation of the action entry in the second policy.

6. A control method according to claim 5, wherein a target to be operated includes a monitoring operation for a component, or an operation management operation such as to deploy, start, stop, and un-deploy.

7. A control method for an information system having a control device that includes a plurality of components, and in which the control device comprises:

a configuration storage unit which stores components information, related to the plurality of components and components relationship information on respective components, each of which is operated by the information system;

a policy storage unit which stores a plurality of policies, each of which includes an action entry including a description of a component to be operated and of an operation to be executed by the component, and a trigger condition entry including a description of a condition for triggering the component to execute the operation;

a list storage unit which stores a component list including component information related to a component to be operated described in the action entry of a policy, and all the other components having a relationship to the component, component information and component relationship information stored in the configuration information storage unit, the control method comprising the steps of:

receiving, by an operation result receiving section, a result of an operation performed in the information system;

selecting a policy having the description of the condition in the trigger condition entry corresponding to the operation result received by the operation result reception section from the plurality of the policies stored in the policy storage unit; and executing an operation described in the action entry of the selected policy, wherein:

in response to receiving a result of an operation performed in the information system by the operation result reception section, the policy selecting section selects a second policy from the plurality of the policies stored in the policy storage unit, determining whether a first policy has already been selected by the policy selecting section and the operation of the action entry in the first policy is being executed;

if the operation of the action entry in the first policy is being executed, then identifying a first component list related to the first policy and a second component list related to the second policy from the list storage unit;

comparing the first component list with the second component list in the list storage unit in order to determine whether both the first and second component lists include a common component information related to a common component;

if both of the first and second component lists do not include a common component information, then executing the operation of the action entry in the second policy during the operation of the action entry in the first policy that is being executed; and if both of the first and second component lists include common component information, then suspending the execution of the operation of the action entry in the second policy.

8. A computer-readable program of executable instructions recorded on non-transitory computer-readable media which when executed causes a computer to function as a control device for controlling an information system that includes a plurality of components, the control device comprising:

a configuration storage unit which stores components information, related to the plurality of components and components relationship information on respective components, each of which is operated by the information system;

a policy storage unit which stores a plurality of policies, each of which includes an action entry including a description of a component to be operated and of an operation to be executed by the component, and a trigger condition entry including a description of a condition for triggering the component to execute the operation;

a list storage unit which stores a component list including component information related to a component to be operated described in the action entry of a policy and all the other components having a relationship to the component according to the component information and component relationship information stored in the configuration information storage unit;

an event reception section which receives an event occurring in the information system;

a policy selecting section which selects a policy having the description of the condition corresponding to the event received by the event reception section from the plurality of the policies stored in the policy storage unit; and a policy execution section which executes an operation described in the action entry of the selected policy, wherein:

in response to receiving an event by the event reception section, the policy selecting section selects a second policy from the plurality of the policies stored in the policy storage unit;

the policy execution section determines whether a first policy has already been selected by the policy selecting section and the operation of the action entry in the first policy is being executed;

if the operation of the action entry in the first policy is being executed, the policy execution section identifies a first component list related to the first policy and a second component list related to the second policy from the list storage unit;

the policy execution section compares the first component list with the second component list in the list storage unit in order to determine whether both the first and second lists include a common component information related to a common component;

if both of the first and second component lists do not include a common component information, the policy execution section executes the operation of the action entry in the-second policy during the operation of the action entry in the first policy that is being executed; and if both of the first and second component lists include a common component information, the policy executing section suspends the execution of the operation of the action entry in the second policy.

9. A computer-readable program according to claim 8, wherein a target to be operated includes a monitoring operation for a component, or an operation management operation such as to deploy, start, stop, and un-deploy.

10. A computer-readable program of executable instructions recorded on non-transitory computer-readable media which causes a computer to function as a control device for controlling an information system that includes a plurality of components, the control device comprising:

a configuration storage unit which stores components information, related to the plurality of components and components relationship information on respective components, each of which is operated by the information system;

a policy storage unit which stores a plurality of policies, each of which includes an action entry including a description of a component to be operated and of an operation to be executed by the component, and a trigger condition entry including a description of a condition for triggering the component to execute the operation;

a list storage unit which stores a component list including component information related to a component be operated described in the action entry of a policy, and all the other components having a relationship to the component according to the component information and component relationship information stored in the configuration information storage unit;

an operation result reception section which receives a result of an operation performed in the information system;

a policy selecting section which selects a policy having the description of the condition in the trigger condition entry corresponding to the operation result received by the operation result reception section from the plurality of the policies stored in the policy storage unit; and a policy execution section which executes an operation described in the action entry of the selected policy, wherein:

in response to receiving a result of an operation performed in the information system by the operation result reception section, the policy selecting section selects a second policy from the plurality of the policies stored in the policy storage unit, the policy execution section determines whether a first-policy has already been selected by the policy selecting section and the operation of the action entry in the first policy is being executed;

if the operation of the action entry in the first policy is being executed, the policy execution section identifies a first component list related to the first policy and a second component list related to the second policy from the list storage unit;

the policy execution section compares the first component list with the second component list in the list storage unit in order to determine whether both the first and second component lists include a common component information related to a common component;

if both of the first and second component lists do not include a common component information, the policy executing section executes the operation of the action entry in the second policy during the operation of the action entry in the first policy that is being executed; and if both of the first and second component lists include common component information, the policy executing section suspends the execution of the operation of the action entry in the second policy.

* * * * *